United States Patent [19]

Bates

[11] 4,272,790
[45] Jun. 9, 1981

[54] VIDEO TAPE EDITING SYSTEM
[75] Inventor: George W. Bates, Santa Ana, Calif.
[73] Assignee: Convergence Corporation, Irvine, Calif.
[21] Appl. No.: 23,759
[22] Filed: Mar. 26, 1979
[51] Int. Cl.³ .................... H04N 5/78; G11B 15/46
[52] U.S. Cl. .................................. 360/14; 360/10; 360/73
[58] Field of Search .......................... 360/14, 10, 73

[56] References Cited

U.S. PATENT DOCUMENTS

| | | | |
|---|---|---|---|
| 3,721,757 | 3/1973 | Ettlinger | 360/10 |
| 3,914,551 | 10/1975 | Hunt | 179/6 R |
| 3,950,735 | 4/1976 | Patel | 360/73 |
| 3,959,818 | 5/1976 | Iketaki | 360/14 |
| 3,978,521 | 8/1976 | Longer | 360/14 |
| 4,040,098 | 8/1977 | Beeson | 358/127 |
| 4,100,607 | 7/1978 | Skinner | 360/14 |

OTHER PUBLICATIONS

"Microprocessors", by Toong; Sci. Am., Sep. 1977, p. 146.
"An Automatic Videotape Editing/Splicing System Using A Process Computer", by Fujimura et al., Journal of SMPTE, Mar. 1967, p. 169.

Primary Examiner—Bernard Konick
Assistant Examiner—Alan Faber
Attorney, Agent, or Firm—Keith D. Beecher

[57] ABSTRACT

A modular expandable, microprocessor controlled, editing control system is provided for on-line or off-line editing of a cassette or open-reel helical scan-type video tape recorder, or the like. Tape-to-tape editing is carried out by transferring selected video information from a "source" video tape recorder (VTR) to a "record" video tape recorder (VTR). The system includes microprocessor controlled solid state electronic control circuitry for the source and record video tape recorders, with a manually operated joystick which permits forward and reverse motion of the tapes in the recorders for the precise selection of the edit frames. The system is designed to control one source video tape recorder and one record video tape recorder, in its basic configuration, using standard control track pulses for edit cycle accuracy. The system, however, may be expanded by plugging in modules and replacing front panel components so as to provide more complex edit control systems capable of controlling multiple video tape recorder sources, as well as alternate sources, special effects, interactive cathode-ray tube displays, multiple edit point storage, decision list print-outs, and so on.

5 Claims, 26 Drawing Figures

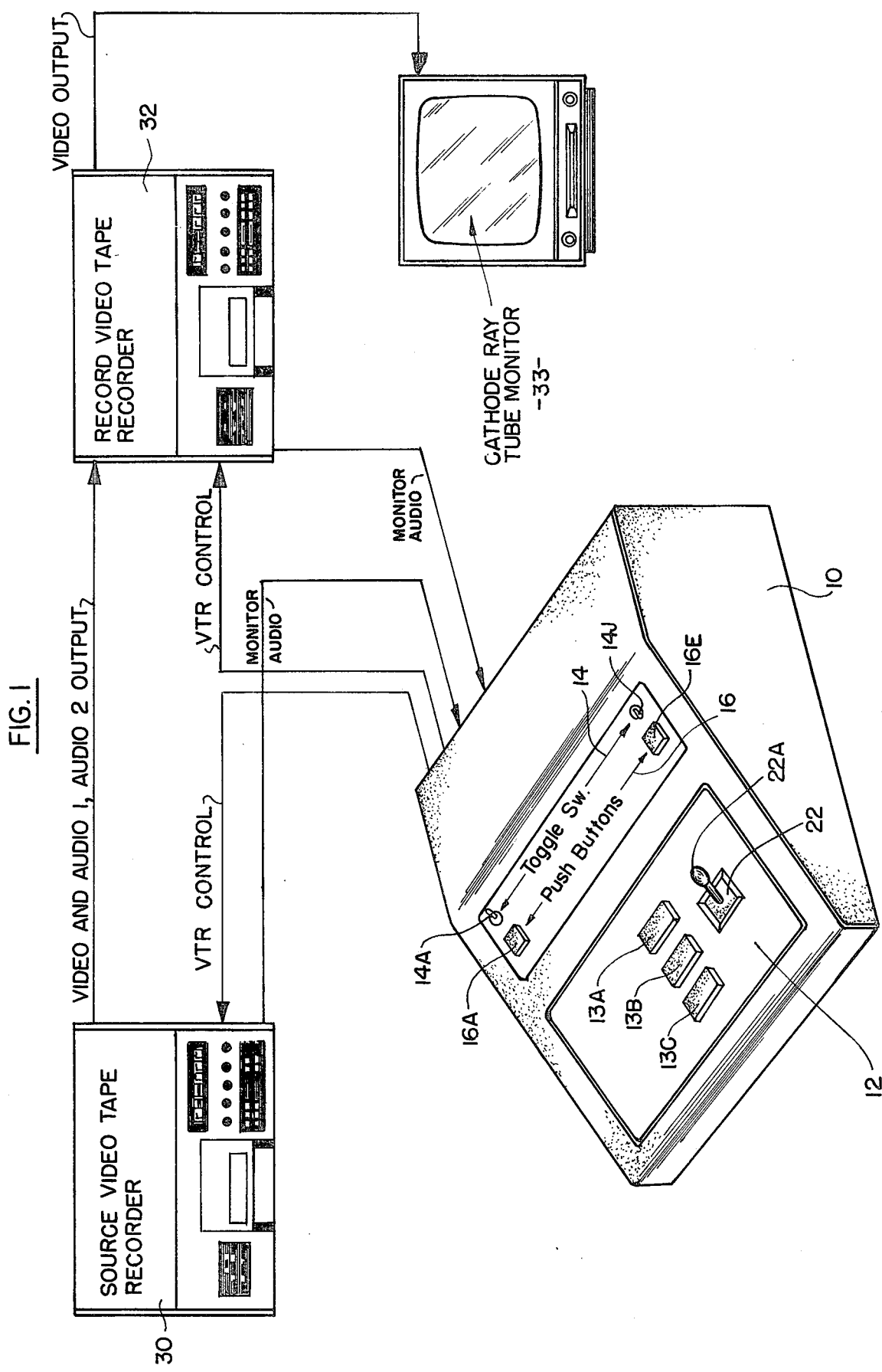

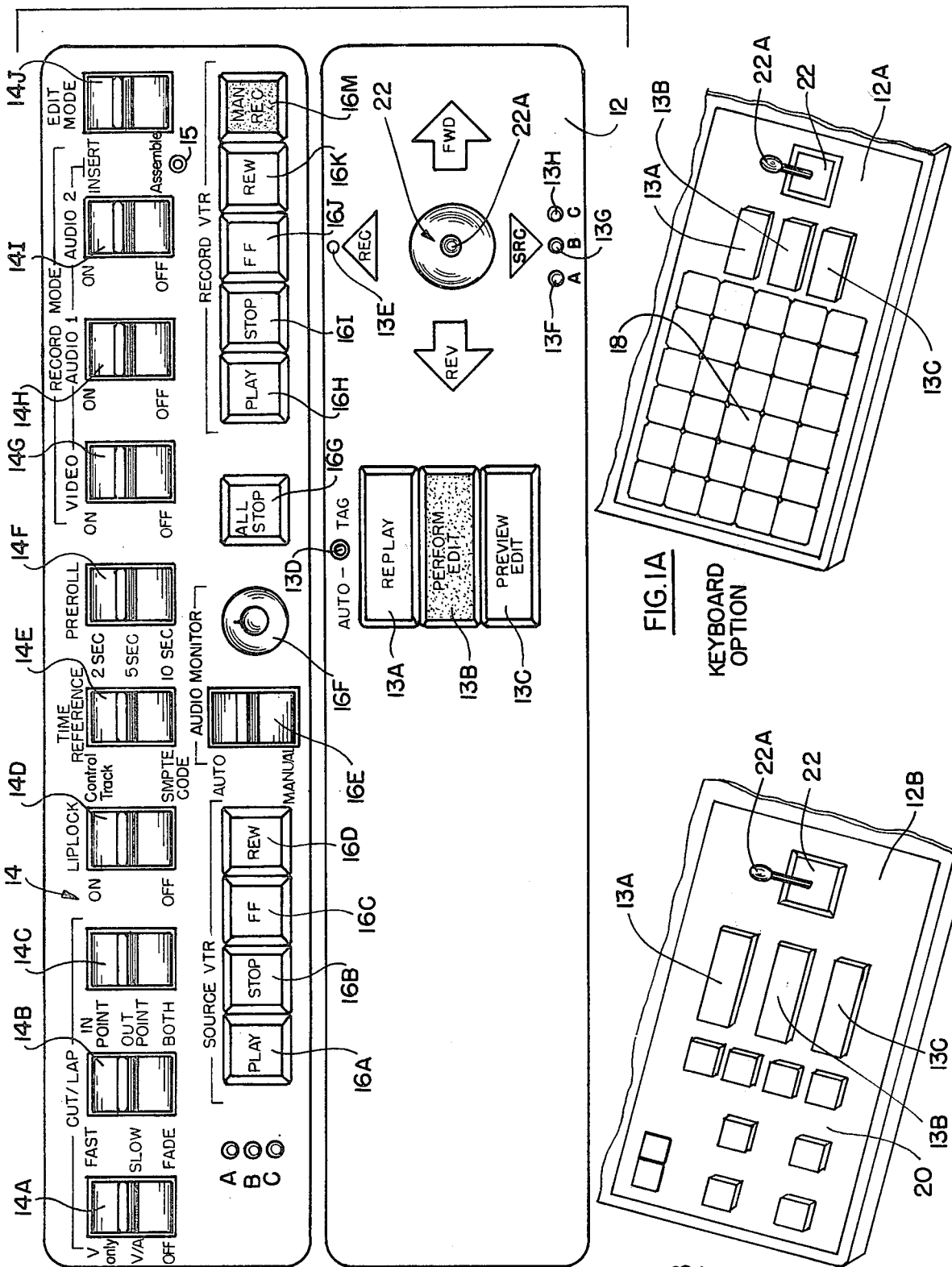

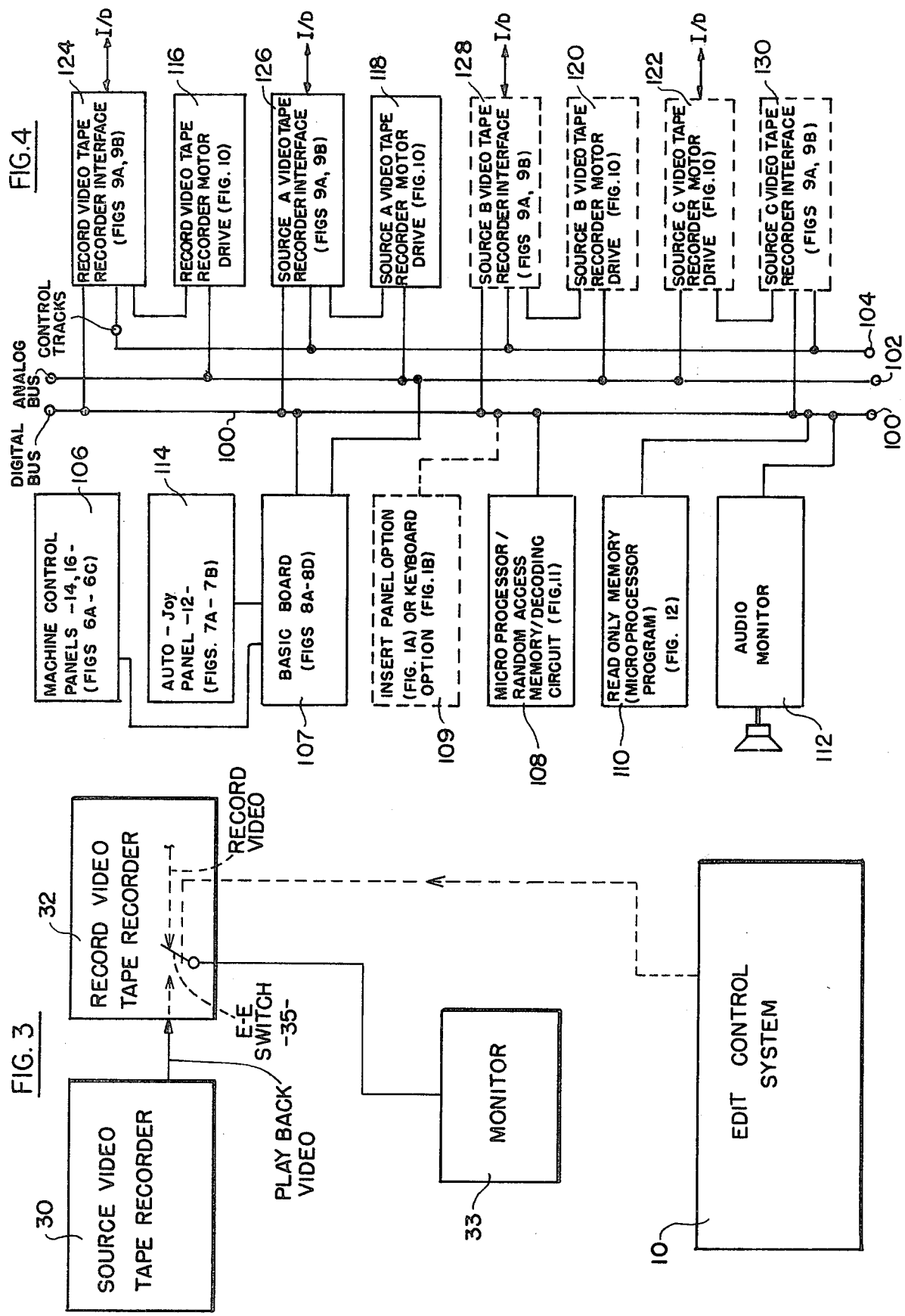

FIG.5A

| GP | ADDRESS | INPUT 7 | 6 | 5 | 4 | 3 | 2 | 1 | 0 | OUTPUT 7 | 6 | 5 | 4 | 3 | 2 | 1 | 0 |
|---|---|---|---|---|---|---|---|---|---|---|---|---|---|---|---|---|---|
| 0 | B000 | E/E DEF | 60 HZ | OUT BOTH | OUT IN | SLOW FAST | SLOW FADE | A/V OFF | A/V ONLY | | | | | UP | FAST | CL. BYPASS | V ONLY |
| | 1 | CTL CD | AUTO MAN | A1 | A2 | V | A3 | 2 | 5 10 | SEL | | SOURCE | | | RECORD | | |
| | 2 | CHR RDY | ZERO joy pos | FWD REV | LIP ON | KEY | CODE | | | AUTO TAG | S PREV | S PERF | S REPLAY | ALL STOP | P PREV | P PERF | P Replay |
| | 3 | | | | | | | | | SR | SA | SB | SC | PR | PA | PB | PC |
| 1 | B004 | | | | | | | | | | | | | | | | |
| | 5 | | | | | | | | | | | | | | | | |
| | 6 | CTL TRACK | CTL FREQ 300 | VTR STBY | MOTION CMD | MOTION STATUS | | CTL COUNT | | JOY EN | BUMP | CRUISE | CUE | MOTOR CONTROL | | FWD | NORM FWD |
| | 7 | | | | | | | | | A IN | A E/E | A1 ON | A2 ON | V ON | A3 ON | EDIT IN | V E/E |
| 2 | B008 | | | | | | | | | | | MSD | | | | LSD | |
| | 9 | CLEAR R | CLEAR A | SWITCH B | SWITCH C | SET R | SET A | SWITCH B | SWITCH C | DEVICE CODE | | DECADE SEL | | D.P. OUT | DEC. PT | DIGIT | |
| | A | CTL TRACK | CTL FREQ 300 | VTR STBY | Motion CMD | MOTION STATUS | | CTL COUNT | | JOY EN | BUMP | CRUISE | CUE | MOTOR CONTROL | | FWD | NORM FWD |
| | B | | | | | | | | | | | | | | | | |
| 3 | B00C | MSD | | | | LSD | | | | MSD | | | | LSD | | | |
| | D | MSD | | | | LSD | | | | DEVICE | | CODE | | COMMAND | | | |
| | E | CTL TRACK | CTL FREQ 300 | VTR STBY | Motion CMD | MOTION STATUS | | CTL COUNT | | JOY EN | BUMP | CRUISE | CUE | MOTOR CONTROL | | FWD | NORM FWD |
| | F | | | | | | | | | | | | | | | | |
| 4 | B010 | | | | | | | | | | | | | | | | |
| | 11 | | | | | | | | | | | | | | | | |
| | 12 | CTL TRACK | CTL FREQ 300 | VTR STBY | Motion CMD | MOTION STATUS | | CTL COUNT | | JOY EN | BUMP | CRUISE | CUE | MOTOR CONTROL | | FWD | NORM FWD |
| | 13 | | | | | | | | | | | | | | | | |
| 5 | B014 | MSD | | TRIM | | LSD | | TRIM | | F OUT | SOURCE S | F IN | S | F OUT | RECORD S | F IN | S |
| | 15 | SCR REC | SET TIMER | OUT | IN | CLR | OPT | + | − | | | | | CLR | OPT | + | − |
| | 16 | | | | | | | | | | | | | | | | |
| | 17 | Status | Shift | ROW | | | COLUMN | | | LIST | ANI | ADR | | SPLIT LAMPS | | TOP ROW LAMPS | |
| 6 | B018 | PERF EDID | ON | | | FRAME | SELECT BCD | | | | | | | | REC F | S | RDY |
| | 19 | | | | | | | | | | | | | | | | |
| | 1A | FULL | AV EFF | SPLIT | B | C | INSERT | | CRT | LL Bypass | R | A | B | C | BLK | AUX | BEEP |
| | 1B | MAINT | | R QUAD | R 1" | A 1" | B 1" | C 1" | | | | | | | | | |
| 7 | B01C | ◄── | | DATA | IN | | | | ──► | ◄── | | DATA | | OUT | | | ──► |
| | 1D | ◄── | | STATUS | | | | | ──► | ◄── | | | CONTROL | | | | ──► |
| | 1E | | | | | | | | | | | | | | | | |
| | 1F | ◄── | | 6850 | CONFIG | | | | ──► | | | | | | | | |

FIG. 5B

| CD | MODE | SPEED | TYPE | CUE | SEL | SOURCE | RECORD | MOTR CTL | DEV | DEC | DIGIT | KEY CODE | CD | KEY CODE |
|----|------|-------|------|-----|-----|--------|--------|----------|-----|-----|-------|----------|----|----------|
| 0 | OUT | SLOW | A/V | 5 | OFF | OFF | OFF | STOP | R | HR | HRM | SSTOP | 8 | R.REC |
| 1 | IN | FAST | V ONLY | 10 | A | STOP | STOP | PLAY | A | MIN | HR.L | S.PLAY | 9 | SJOY |
| 2 | BOTH | FADE | OFF | 2 | B | PLAY | PLAY | FF | B | SEC | MIN.H | S.FF | A | RJOY |
| 3 | * | * | * | * | C | FF | FF | REW | C | FR | MIN.L | S.REW | B | CRUISE |
| 4 | | | | | | REW | REW | | | | SEC.H | R.STOP | C | PREV |
| 5 | | | | | | * | M.REC | | | | SEC.L | R.PLAY | D | PERF |
| 6 | | | | | | * | * | | | | FR.H | R.FF | E | RPLAY |
| 7 | | | | | | * | * | | | | FR.L | R REW | F | M.STOP |

FIG. 5C

| CD | FUNC | B00C | B00D | CD | FUNC | B00C | B00D | CD | FUNC | B00C OUT | | To/From CD | TRAN CD | SPUT | TOP ROW |
|----|------|------|------|----|------|------|------|----|------|----------|---|-----------|---------|------|---------|
| 0 | RH | HR | MIN | 8 | READ STATUS | * | RABC | 0 | SWITCH | TO CD | FROM CD | OFF | KEY | OFF | OFF |
| 1 | RL | SEC | FR | 9 | OUT USER | * | RABC | 1 | TRAN | TRAN CD | W MSD | A | K.OUT | SHIFT | R |
| 2 | AH | HR | MIN | A | * | * | * | 2 | WIPE | WIPE NSD | WIPE LSD | B | K.FADE | ASPUT | A |
| 3 | RL | SEC | FR | B | * | * | * | 3 | DUR | DURATION | | C | K.BOTH | VSPUT | B |
| 4 | BH | HR | MIN | C | * | * | * | 4 | CMND | STRT F B | B y/p | BLK | CUT | | C |
| 5 | BL | SEC | FR | D | * | * | * | 5 | * | * | | AOX | WIPE | | BLK |
| 6 | CH | HR | MIN | E | * | * | * | 6 | * | * | | * | DISS | | AOX |
| 7 | CL | SEC | FR | F | * | * | * | 7 | * | * | | * | * | | * |

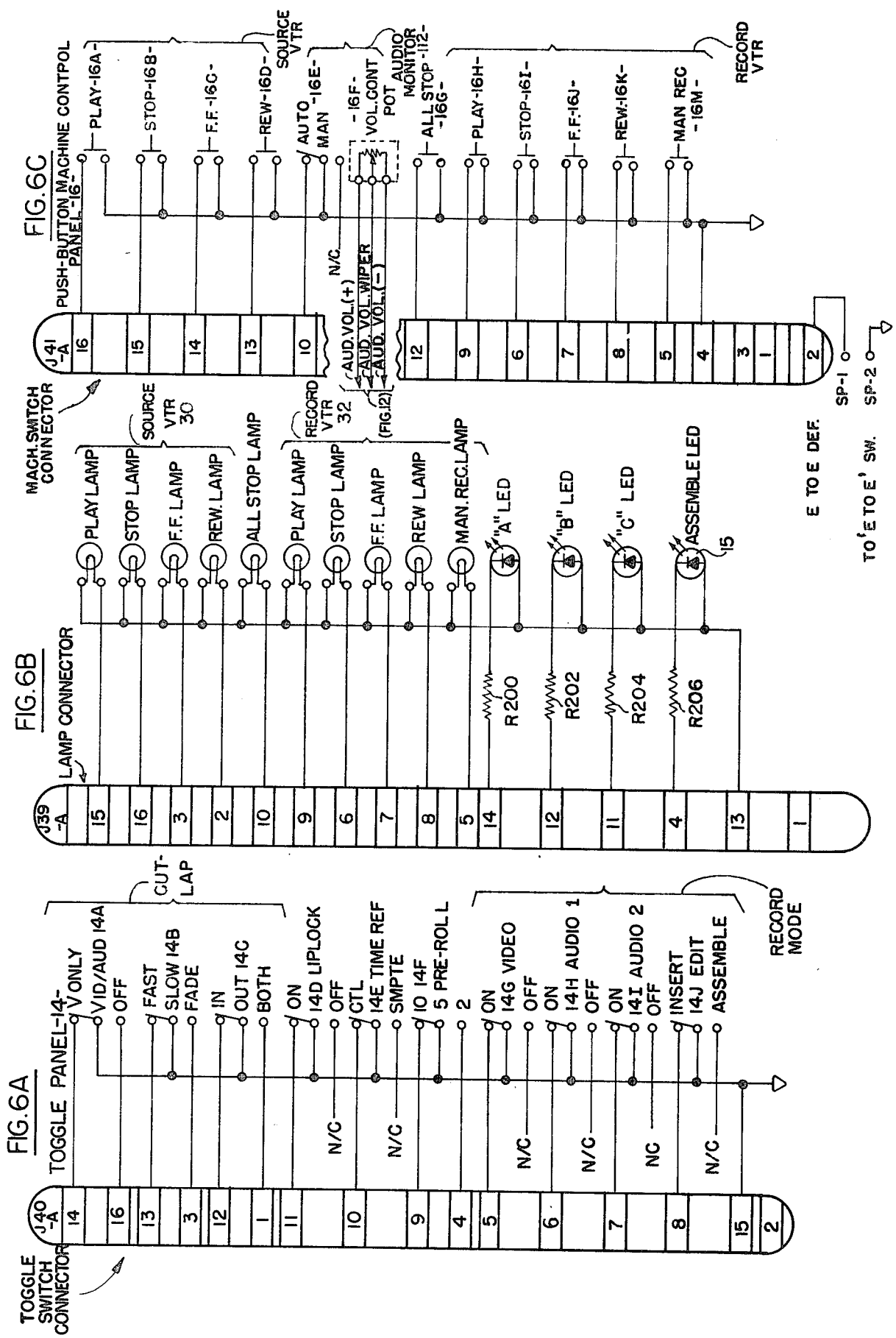

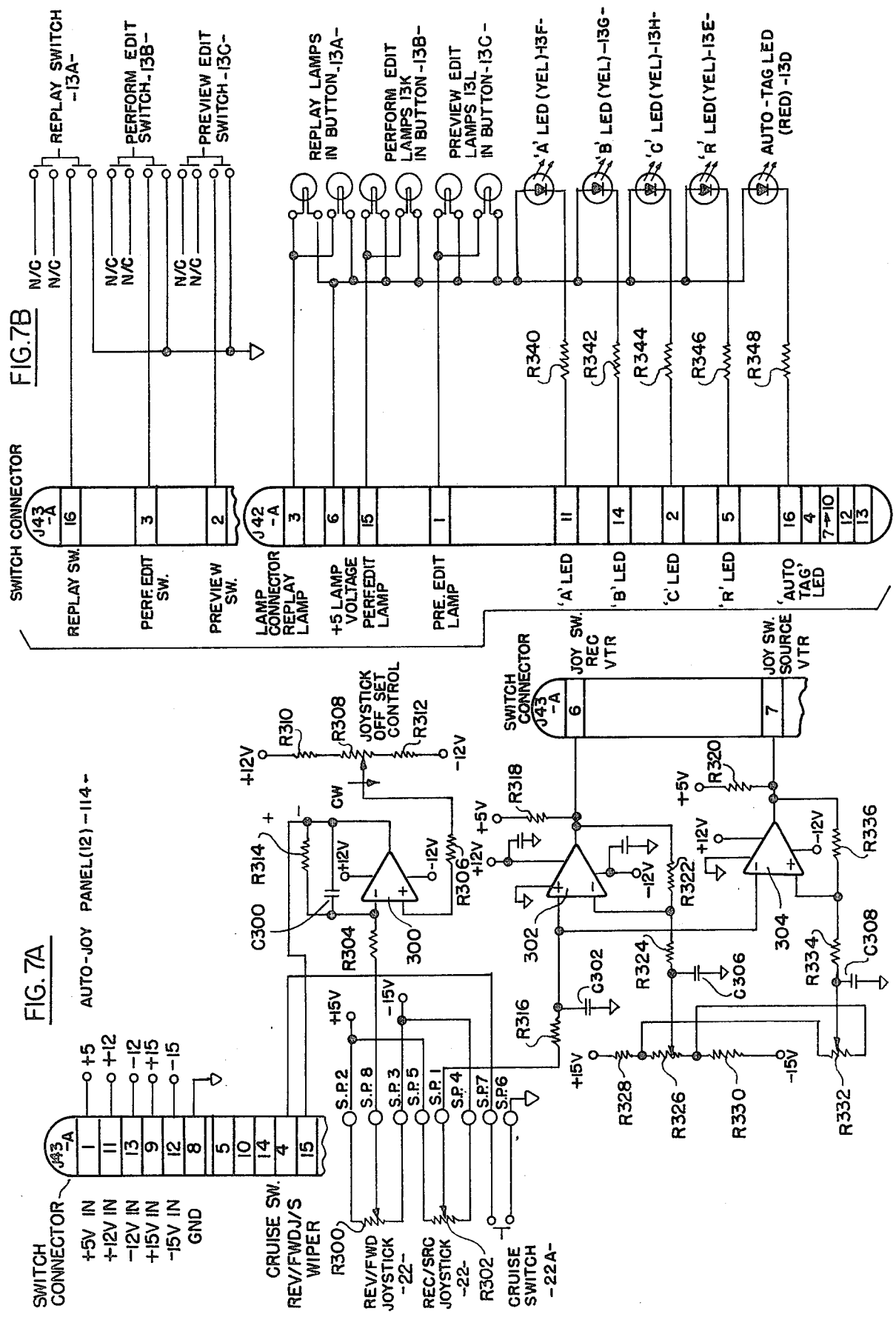

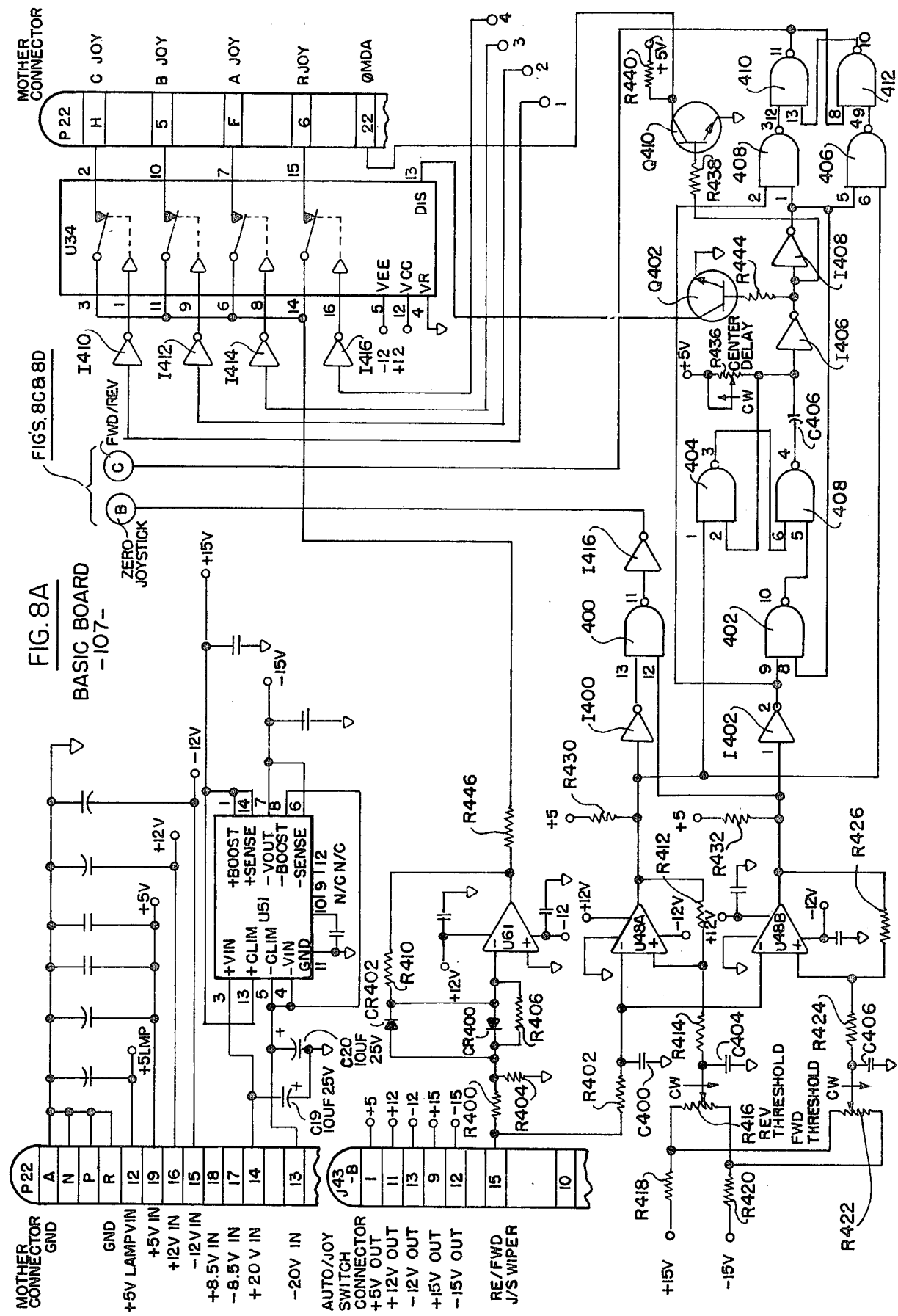

BASIC BOARD -107-

BASIC BOARD -107-

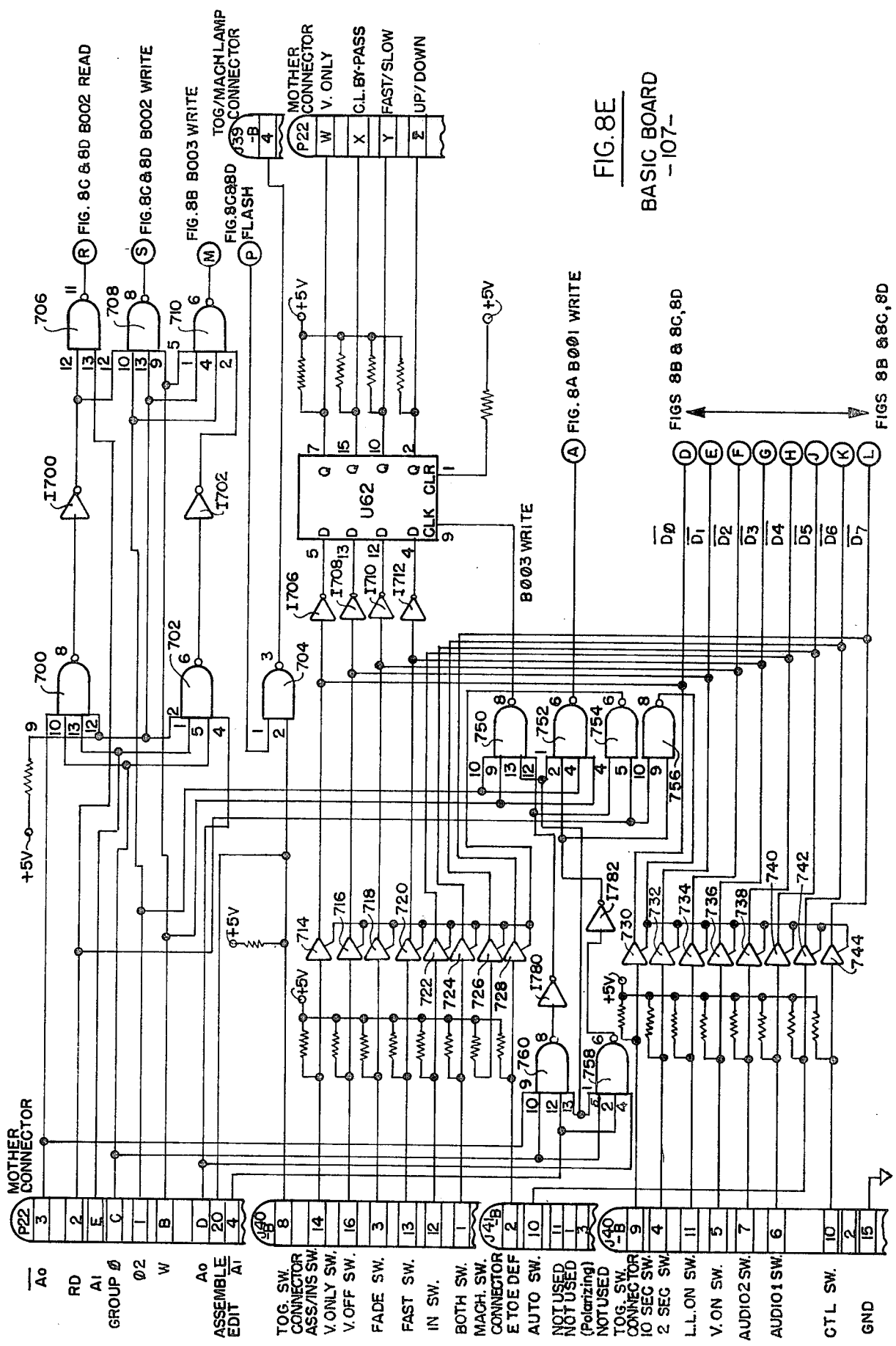

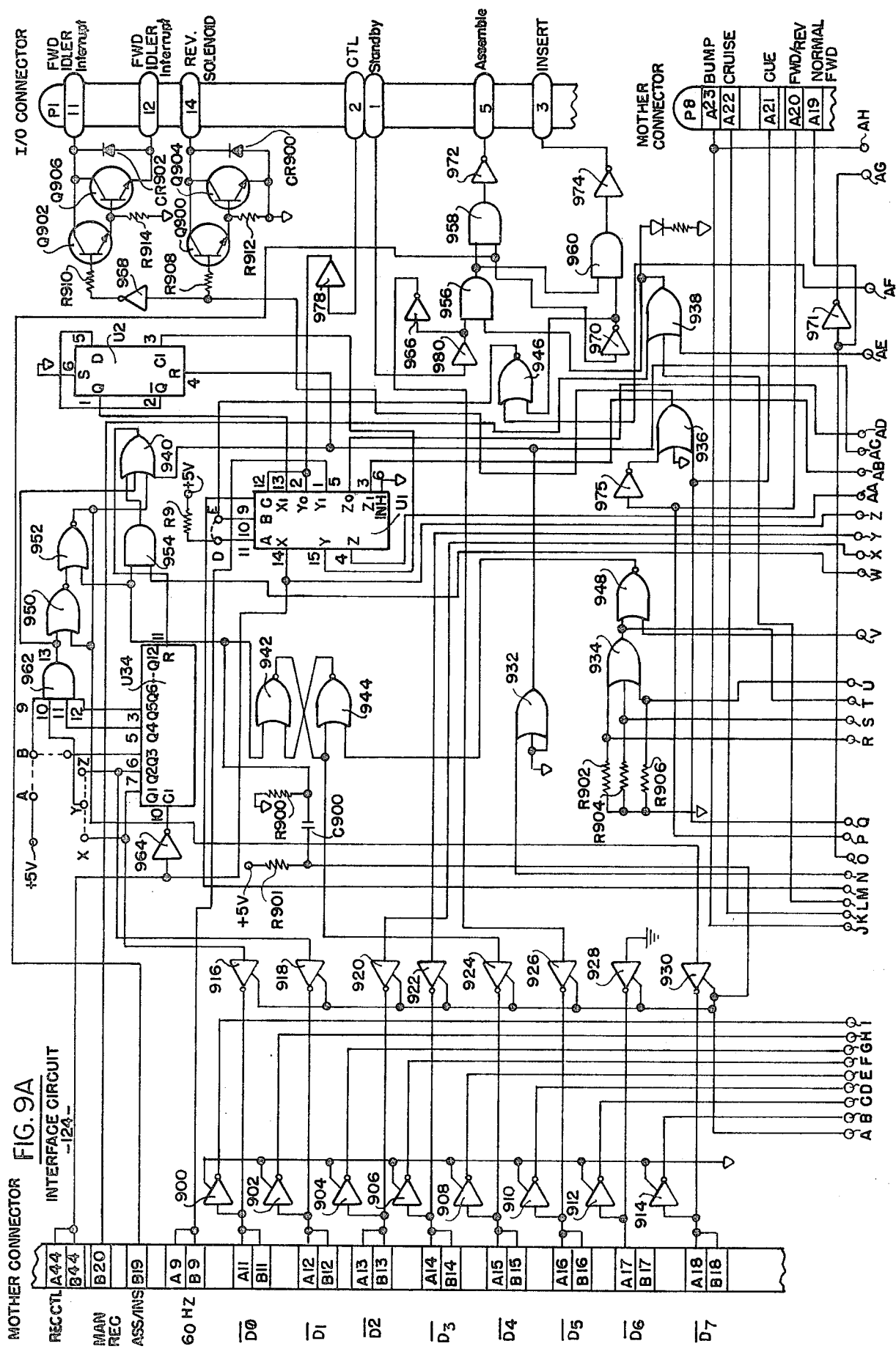

INTERFACE CIRCUIT -124-

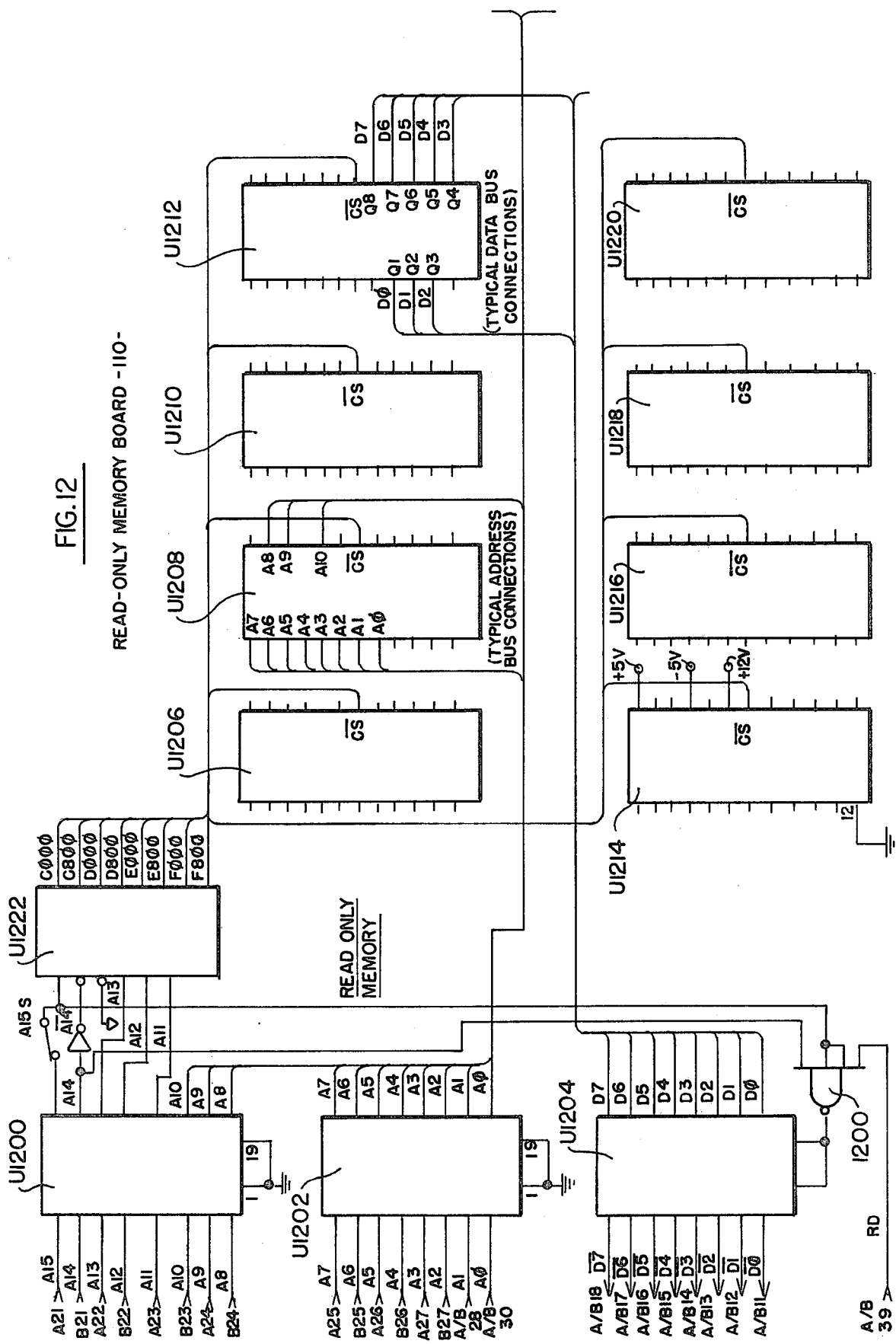

VIDEO TAPE EDITING SYSTEM

BACKGROUND OF THE INVENTION

The video tape editing control system of the invention fulfills a growing need in the television industry for a practical means to permit accurate and rapid editing or video tapes, so that a finished edited master tape may be produced from the video information on one or more original tapes, or directly from a video camera. A system is described in U.S. Pat. No. 4,040,098 which is assigned to the present Assignee, which fulfills the aforesaid need in that it provides a low cost and accurate control system which is capable of interfacing both the cassette and open reel types of helical scan video tape recorders for precise tape-to-tape or camera-to-tape editing. The system of the present invention presents simplifications and improvements in the joystick control; and it also presents simplifications in circuitry and reductions in cost, in that it is microprocessor controlled. Moreover, the system of the present invention is modular in form so as to be adaptable from a basic unit to more complex configurations, as mentioned above, and as will be described in detail in the present specification.

It is conventional practice to provide video tapes with a control track in which pulses are recorded at pre-selected rate for control purposes. The editing control system of the invention utilizes the pulses from the video tape control track precisely to control the operation of both the source video tape recorder and the record video tape recorder around the selected edit frame, thereby obviating the need for complicated time codes on the tapes themselves, and for ancillary complex control equipment.

The editing control system of the invention, in the embodiment to be described, includes a single manually-operated joystick potentiometer means which serves to control the forward and reverse movements of the video tapes in the source and record video tape recorders in the vicinity of the edit frames so as to permit exact edit frames on the tapes to be selected. The joystick provides an extremely tight control of tape speeds in either direction from still frame up to, for example, three times normal tape speed. A "cruise" control switch is also provided to enable the tapes to be driven indefinitely at any set joystick speed.

The editing system of the invention, similar to the editing system illustrated and described in the aforesaid patent, and as will be described, may use a single cathode-ray tube monitor, which monitors both the source and the record video tape recorders, and which may be controlled to provide a repeatable preview of the individual edit frames before an actual "edit" or transfer of information to the record video tape recorder is made.

In the editing control system of the invention, as in the system disclosed in the aforesaid patent, the video signals are fed directly from the source video tape recorder to the record video tape recorder. It is, therefore, possible to use time base correctors, processing amplifiers, drop-out compensators, or the like, without affecting in any way the operation of the editing control system. Also, since the editing control system does not process any of the video signals themselves, the quality of the video signals is unaffected by the control system.

BRIEF DESCRIPTION OF THE DRAWINGS

FIG. 1 is a perspective representation of the control unit of the invention in its basic configuration, and a schematic representation of how the unit may be connected to a source video tape recorder and to a record video tape recorder and monitor;

FIG. 1A is a representation of a keyboard option which may be installed in the unit of FIG. 1, in place of the basic control panel, and which includes a keyboard for additional controls;

FIG. 1B is an insert panel option which, likewise, may be installed in the basic unit, in place of the original control panel, so as to provide additional controls for the system;

FIG. 2 is a plan view of the control panels in the basic unit of FIG. 1 showing the various controls included on the control panels;

FIG. 3 is a block diagram of the edit control system, and a source video tape recorder and a record video tape recorder, a monitor and the connections therebetween;

FIG. 4 is a block diagram of the various components which make up the system of the invention in one of its embodiments;

FIGS. 5A–5C are tables representing the input/output definitions in the system of the invention; and FIGS. 6–12 are schematic circuit diagrams of the various components which make up the system of the invention.

DETAILED DESCRIPTION OF THE ILLUSTRATED EMBODIMENT

Figure 2B:
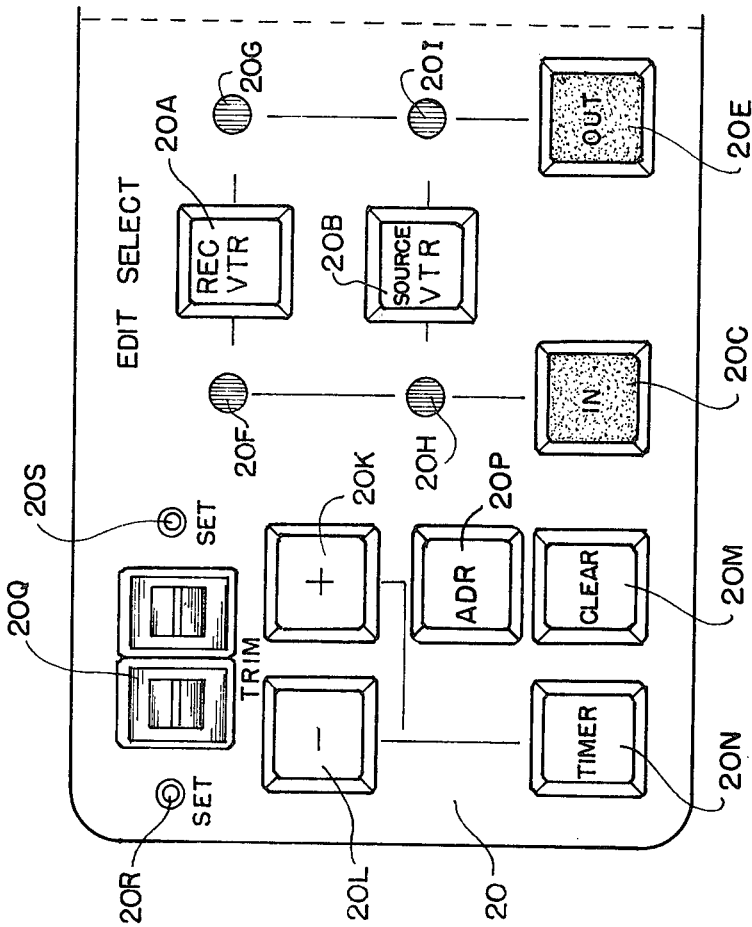
FIG. 2B is a schematic representation of the various components which are included in the insert panel option of FIG. 1B.

As shown in FIG. 1, the system of the invention may be contained in a housing 10 which is equipped with an auto joystick control panel 12. A toggle switch panel 14 is mounted on the unit above the control panel, and a pushbutton switch panel 16 is also mounted on the unit above the control panel, as shown. The auto joystick control panel 12 of FIG. 1 represents the basic unit. As a first option, the control panel 12 may be replaced by a control panel 12a (FIG. 1A) which also contains a keyboard 18 which may be used to effectuate additional controls within the system. As a second option, the control panel 12 may be replaced by a control panel 12b of FIG. 1B, which contains additional controls 20, as will be described. A four-position joystick control unit 22 is mounted on each of the control panels, as are pushbutton switches 13A, 13B and 13C.

As shown in FIG. 2, the toggle switch panel 14 includes a series of three-position toggle switches 14A, 14B and 14C under the general designation "CUT LAP". The toggle switch 14A has three positions designated "V$_{only}$", "V/A" and "OFF"; the switch 14B has three positions designated "FAST", "SLOW", "FADE"; and switch 14C has three positions designated "IN", "OUT" and "BOTH". The toggle switch panel 14 also includes three additional toggle switches designated 14D, 14E, 14F. Switch 14D is designated "LIPLOCK" and has two positions "ON" and "OFF". The switch 14E is designated "TIME REFERENCE" and has two positions designated "CONTROL TRACK" and "SMPTE", for control track or S.M.P.T.E. timing codes. The switch 14F is designated "PRE-ROLL" and has three positions designated "10 sec", "5 sec" and "2 sec", respectively.

The toggle panel 14 also includes four additional two-position toggle switches 14G, 14H, 14I and 14J. These latter switches are designated "RECORD MODE". Switch 14G is designated "VIDEO", and it has two positions designated "ON" and "OFF" respectively. Switch 14H is designated "AUDIO 1" and it also has two positions designated "ON" and "OFF". The switch 14I is designated "AUDIO 2", and it also has two positions designated "ON" and "OFF". Switch 14J is designated "EDIT" and it has two positions designated respectively "INSERT" and "ASSEMBLE". A light emitting diode 15 is positioned adjacent switch 14J and it is energized intermittently whenever the switch is set to the "ASSEMBLE" position.

The pushbutton switch panel 16 includes four pushbutton switches 16A, 16B, 16C and 16D, and these switches are designated "SOURCE VTR". Pushbutton switch 16A is designated "PLAY", pushbutton switch 16B is designated "STOP", pushbutton switch 16C is designated "FF" (Fast Forward), and pushbutton switch 16D is designated "REW" (Rewind). Three light emitting diode indicators A, B and C are positioned adjacent the pushbutton switch 16A. The pushbutton switch panel 16 also includes a toggle switch 16E and are adjacent potentiometer control 16F, these controls being designated "AUDIO MONITOR". Toggle switch 16E has two positions "AUTO" (Automatic) and "MANUAL", respectively. The potentiometer 16F is a level control. A pushbutton switch 16G is also included which is designated "ALL STOP". Five additional pushbutton switches designated 16H, 16I, 16J, 16K and 16M are included, these latter switches being designated "RECORD VTR". Pushbutton switch 16H is labelled "PLAY", pushbutton switch 16I is labelled "STOP", pushbutton switch 16J is labelled "FF" (Fast Forward), pushbutton switch 16K is labelled "REW" (Rewind), and pushbutton switch 16M is labelled "MAN REC" (Manual Record). All the pushbutton switches may be of the type which, when depressed, become illuminated.

The auto joystick control panel 12 includes three pushbutton switches 13A, 13B and 13C designated "REPLAY", "PERFORM EDIT" and "PREVIEW EDIT", respectively. The control panel 12 also includes a light emitting diode (LED) indicator 13D designated "AUTO TAG", a light emitting diode (LED) indicator 13E, and a series of three light emitting diodes (LED) indicators 13F, 13G and 13H, labeled A, B and C respectively.

The basic editor of the invention is divided into two major groups of controls, namely, the toggle and pushbutton panels 14 and 16, and the auto joystick panel 12. The toggle and pushbutton panels consist of machine control functions, editor mode functions and accessory control functions. The machine control functions are further divided into record and source functions. The record functions are Video, On/Off (toggle switch 14G); Audio 1 and 2, On/Off (toggle switches 14H, 14I); Assemble/Insert (toggle switch 14J); Play (pushbutton switch 16H); Stop (pushbutton switch 16I); Fast Forward (pushbutton switch 16J); Rewind (pushbutton switch 16H) and Manual Record (pushbutton switch 16M). The source functions are Play (pushbutton switch 16A), Stop (pushbutton switch 16B), Fast Forward (pushbutton switch 16C) and Rewind (pushbutton switch 16D).

The editor mode functions are Time Reference (toggle switch 14E), Pre-roll Duration (toggle switch 14F), Audio Monitor (toggle switch 16E) and All Stop (pushbutton switch 16G). The Time Reference toggle switch 14E selects either control track or SMPTE time code. This control when used without time code present will allow the tape timers to count in a drop frame mode if the switch 14E is placed in the SMPTE code position. The Pre-Roll Duration switch 14F selects the pre-roll durations and the preview post roll durations of 10, 5 or 2 seconds.

The Audio Monitor consists of the Level Control 16F and the Automatic Manual selection toggle switch 16E. In the automatic mode the Audio Monitor follows the record machine if the editor is in Preview, Perform or Replay. If none of these are in process, it will follow any machine assigned to the joystick. In Manual, the Audio Monitor follows the active source machine.

The All Stop pushbutton switch 16G is used to bring all machines to an immediate halt. If the machines ae unthreaded ($\frac{3}{4}$ inch), they will be placed in the Stop mode. If the machines are not unthreaded, they will be placed in the joy pause mode.

The accessory control functions are for "Cut-Lap" and "Liplock" accessories. "Cut-Lap" is a single source fade-to-black or fade-to-a-partial-black which when joined with a fade-from-a-partial black gives the impression of a lap. The controls for this accessory consist of the three toggle switches 14A, 14B, 14C; switch 14A having a first position for Video Only, a second position for Video and Audio, and a third position for Off; switch 14B having a first position for Fast, a second position for Slow, and a third position for Fade; and switch 14C having a first position for In, a second position for Out and a third position for Both. This accessory is described in Copending Application Ser. No. 929,667, filed July 31, 1978, and assigned to the present assignee.

Liplock is an accessory used in conjunction with the audio monitor and is used to correct the audio pitch shift encountered when joysticking a machine at variable speeds. This accessory is described in Copending Application Ser. No. 847,077, filed Oct. 31, 1977. The Liplock toggle switch control 14D is only for On or Off.

When the joystick 22 is momentarily deflected to the (REC) position, it assigns the joystick to the record video tape recorder 32 (FIG. 1) and illuminates the indicator 13E in FIG. 2. Deflecting the joystick momentarily to the (SRC) position, causes the record machine to be disengaged from the joystick control and causes the source video tape recorder 30 (FIG. 1) to become engaged by the joystick control, illuminating one of the light emitting diode (LED) indicators 13F, 13G, 13H. Then, moving the joystick to the right (FWD) causes the machine assigned to the joystick to be moved in the forward direction at a speed determined by the amount of joystick deflection; and moving the joystick to the left (REV) causes the machine assigned to the joystick to be moved in the reverse direction, again at a speed determined by the amount of joystick deflection.

An additional feature of the joystick control is the Cruise switch 22A (FIG. 1) located at the top of the joystick. When a particular VTR is controlled by the joystick at any given speed or direction, the actuation of the Cruise switch will cause the machine to continue at the same speed independent of the position of the joystick. The appropriate LED indicator 13E, 13F, 13G, 13H will pulse to indicate the Cruise condition. Re-enabling the joystick or any machine controls of the machine in the Cruise mode will disable the Cruise mode with respect to that particular machine.

The Auto Tag LED indicator 13D becomes illuminated at the completion of each edit. Initiation of a new edit with the Auto Tag indicator illuminated will cause the record "in-edit" point to utilize the record "out-edit" point from the previous edit; thus, tagging the new edit directly to the end of the last edit.

The edit controls of the system consist of Preview Edit pushbutton 13C, Perform Edit pushbutton 13B, and Replay pushbutton 13A. The Preview Edit is used to preview a selected edit. The preview cycle causes the video tape recorders (VTR's) to be cued in reverse at approximately two times normal play speed to a point which is determined by the Pre-Roll control 14F. The VTR's are then rolled forward and synchronized during the pre-roll phase of the cycle. At the in-edit point, the record VTR 32 is issued an E-to-E command to E-E switch 35 (FIG. 3), which causes the material from the source VTR 30 to be viewed on the monitor 33 of FIGS. 1 and 3. The preview continues for a duration equal to the pre-roll duration unless an Insert Panel accessory (FIG. 1B) or Full Keyboard accessory (FIG. 1A) is present, and an insert time (in- and out-edit point selections) is programmed.

With an insert duration, the preview cycle continues to the end of the insert time where the E-to-E command is removed and the source and record video tape recorders continue to run for a dutation equal to the pre-roll duration. At the end of this time the video tape recorders are returned to their in-edit points at twice the normal play speed. This completes the preview cycle. At any time during the cue, pre-roll or post roll of the cycle, during which the Preview Edit pushbutton 13C is illuminated in a steady state, the depression of the button will cause the machines to return to their in-edit points. If the Preview Edit button is depressed during the return to edit point (during which the Preview Edit button is pulsing) the preview cycle will be reestablished and the cycle will repeat.

The Perform Edit pushbutton 13B is used to establish a perform cycle, but requires the depression of the Preview Edit button 13C in conjunction with the Perform Edit button 13B. The perform cycle cues the source and record video tape recorders at twice normal speed to the points determined by the pre-roll setting. The machines are then rolled forward, synchronized, and placed into record at the edit point. If no out-edit points are defined by the Insert Panel or Full Keyboard accessories of FIGS. 1B and 1A, the record cycle continues until the Perform Edit pushbutton 13B is depressed, terminating the edit and initializing the Auto Tag Feature and the Replay enable. The Replay feature allows the review of the previous edit. The Replay pushbutton 13A is illuminated in a pulsing mode at the end of each edit. If the button is then depressed, it will cause a replay cycle to be established. The replay cycle causes the record machine to be cued at two times normal play speed to just prior to the in-edit point of the previous edit and then rolls the record machine forward until just after the out-edit point. During the cycle, the Replay button 13A is illuminated steady, and depressing that button will cause the cycle to be terminated. If the joystick is enabled for the record machine or any record machine control is enabled, or a preview or perform edit cycle is entered, the replay becomes disabled. Replay does not prevent the use of an Auto Tag.

The basic editor of FIG. 1 is self-contained in an aluminum housing with thermal-formed plastic end walls. The housing is hinged at the rear to allow the top of the housing to be raised for access to the internal electronics for maintenance and addition of accessories. All controls and signals interface from the rear panel of the housing with the exception of the head set jack, which is located on the front of the housing. The unit is powered by a self-contained power supply which requires 115/230 VAC, 50/60 Hz, and consumes a maximum of 170 watts. The housing, in a constructed embodiment, measures 17 inches wide by 18½ inches deep and stands 5½ inches above its four rubber feet at the rear, and slopes from a point 8½ inches from the rear to a height of about 3 inches above its feet at the front of the housing.

The Lip-Lock accessory, as described in Copending Application Ser. No. 847,077, is used in conjunction with the audio monitor to correct for audio pitch shift during variable speed tape motion. Its range of effectiveness is from approximately 1/5 times to approximately 2½ times normal play speed. This accessory consists of an assembly which is installed within the editor. The toggle switch 14D on the toggle panel 14 is used to enable or disable this accessory.

The Cut-Lap accessory, as described in Copending Application Ser. No. 929,667 provides fades or partial fades at either or both ends of the edit on video, or both video and audio material. The Cut-Lap accessory, as described above, is controlled by the toggle switches 14A, 14B and 14C on the toggle switch panel 14 in FIG. 2.

The full keyboard accessory 18 of FIG. 1A retains all the features of the basic editor of FIG. 2, and adds many additional features. Some of the features require additional accessories. A cathode-ray tube display accessory must be present for operation of the full keyboard. For control of more than one source video tape recorder, and black and auxiliary inputs, either an audio/video switch, or a Switch-Effects accessory must be present. These are controlled by a parallel input/output circuit card. The added features associated with the full keyboard are Search, Split Edit, Tag, Trim, Keyboard and Tape Locations, In-and-Out edit point loading, special single machine previews (BVB and VBV), A/B rolls, timer setting for non-time code applications, control of lister and ADR accessory, store and recall of time codes, and control of system initialization.

The insert panel 12B of FIG. 1B may be added to any basic system which does not have the full keyboard accessory. The insert panel is used to establish both in and out edit points, and it provides the ability to adjust (trim) these edit points by a selected number of frames from 1-99 in either a (+) or (−) direction.

The specifications for the toggle switch and pushbutton controls of FIG. 2 are as follows:

Cut-Lap Toggle Switch 14A—3 positions—Video Only Processed—Video and Audio Processed—Off.

Cut-Lap Toggle Switch 14B—3 positions—Slow—1 second ramp, start or end edit at 66% duration—33% amplitude; Fast—½ second ramp, start or end edit at 66% duration—33% amplitude; and Fade—1 second ramp, start or end edit at 100% duration—0% amplitude.

Cut-Lap Toggle Switch 14C—3 positions—IN (perform operations at "IN" edit point; OUT (Perform operations at "OUT" Edit Point; BOTH (Perform operations at both the "IN" and "OUT" edit points.
Lip-Lock Toggle Switch 14D—2 positions—On—Off.
  Without Lip-Lock
    On=Audio Timing
    Off=Video Timing
  With Lip-Lock—Same Timing
    On—Lip-Lock (Audio Timing)
    Off—No Lip-Lock (Video Timing)
Time Reference Toggle Switch 14E—2 positions—Control Track (CTL) and SMPTE (Code).
  CTL:
    Control Track Only Operation.
    Timer in Non Drop Frame Mode.
  CODE:
    1. No Time Code present
      a. After Power Reset uses CTL in Drop Frame Mode. (DF)
      b. If last Time Code was Non-Drop Frame and there has been no Power Reset then uses CTL Non-Drop-Frame (NDF) Mode
    2. With Time Code present
      a. Uses NDF/DF as defined by Incoming Code.
      b. Continues to use CTL for timers but compares and updates if needed when CTL and valid code present.
Pre-roll Toggle Switch 14F—determines the duration of Pre-Roll Time—3 positions—10 seconds—5 seconds and 2 seconds (Post Roll duration is equal to "CUE" duration for each position of switch for PREVIEW only).
Record Mode Toggle Switch 14G—two-position—used to turn off video for audio-only edits.
Audio 1 Toggle Switch 14H—two-position—used to inhibit the record video tape recorder from recording on Audio Channel 1 during Insert Record Mode.
Audio 2 Toggle Switch 14I—two position—serves to inhibit the record video tape recorder from recording on audio channel 2 during insert record mode.
Toggle Switch 14J—sets the system to perform an insert or an assemble edit . . . whenever the switch is set to "assemble" the LED 15 flashes.
Machine Control Enabled indicators A, B, C—indicate which source of three source video tape record machines is connected to the source of control pushbuttons 16A–16D.
  Actuated by last source (A, B or C) button depressed.
  Will reflect present button depressed except for Black, Aux or Rec. Indicator is enabled steadily.
Source Fast Forward Pushbutton Switch 16C—causes the source video tape recorder to enter its fast forward mode illuminated when depressed and activated.
Source Rewind Pushbutton Switch 16D—causes the source video tape recorder to stop and then rewind.
  Illuminated when depressed or activated. May be activated by VTR, REW (on Editor) or µP in Search or Preview/Perform Modes (with Time Code Only).
    Extinguished by any other machine control function on that machine, or by microprocessor at end of Search, or when in predetermined range of Cue Point (Preview/Perform Mode with Time Code and Fast Read Head). Also extinguished for Master Stop, Power Reset.
Source Stop Pushbutton Switch 16B—causes the source video tape recorder to stop.
  Illuminates when depressed or activated.
  May be activated by VTR, Editor or µP.
  Extinguished by other machine control or editor operations (Joy and Search).
  Auto modes are PVW, PERF., Search (Full Keyboard only).
  Also illuminates for:
    All Stop→If in "FF" or "REW"
    Power Reset→If in "FF" or "REW"
Source Play Pushbutton Switch 16A—used to put the source video tape recorder in Play and the editor system in a normal mode, overriding and cancelling all editor functions.
  Illuminated when depressed or activated.
  Activated by machine or editor only.
  Extinguished by any other machine control or any Auto Mode or other Editor Mode which controls a machine.
  Auto Mode is PVW, PERF. or SEARCH (Full Keyboard Only).
  Does not clear Edit Points.
Audio Monitor Toggle Switch 16E—when placed in automatic, monitors the audio from the record monitor output during the preview and perform edit cycles at amplitude set by potentiometer 16F; when set in manual, the audio follows the top row selection buttons of FIG. 2A.
  Auto→Audio from Record Monitor Output during PVW/PERF cycles.
  If not in PVW/PERF then joystick enabled machine.
  If not in PVW/PERF or Joystick it follows any machines in Play with the following priorities:
    1. Record
    2. Source selected on Source machine controls
    3. Any Source if only one is in Play
  Manual→Audio follows top row selection (Basic and Insert option top row means A Source only).
All Stop Pushbutton Switch 16G
  1. Stops all machines
    a. Threaded=Joy Pause
    b. Unthreaded=Stop
  2. Cancel all cruises
  3. Undelegate joystick enables
  4. Cancel PVW, Replay, Edit (Cleanly) Modes
  5. Log Edit out points
  6. Enable Auto Tag if in edit
  7. No effect on KBD Top row
  8. Cancel Search (To Stop)
  9. Normalize µP
  10. Clears all pre-fix keys including Trim
The Manual Record Pushbutton Switch 16M—two position—"REC" and "PLAY"—REC position will generate E-E pushbutton switches.
  Dual Button, "REC"—"Play"
  To Activate—Illuminated (steady) Red Cap.
  Cancelled if
    1. Any Record machine control
    2. All Stop
    3. Pwr Reset
    4. Joy Enable
Pushbutton Switches 16H–16A—Record machine—functions same as source machine 16A–16D except assigned to record machine.
Reference REC-Record Joystick Enable
  Used to:
    a. Assign Joystick to Record machine
    b. Will cancel Auto Tag is enabled
    c. When Enable will load tape if in Stop d. Will override FF or REW. and load tape
Inhibited By:
  a. Automatic Modes (Search, PVW, PERF.)
Un-Assigned by:
  a. Automatic Mode (Search, PVW, PERF.)
  b. Any machine control (Record)
  c. All Stop
  d. Power Reset
  e. Record Cruise
  f. Out edit point loaded on the fly
Reference SRC—Sourch Joystick Enable
  Used to:
    a. Assign Source machine (A/B or C) to Joystick control.
    b. Loads tape if in Stop.
    c. Overrides FF or Rew and loads tape.
  Inhibited by:
    a. Automatic modes (Search, PVW, PERF.)
  Un-Assigned by:
    a. Automatic Mode which included use of Assigned machine
    b. Edit out point entered on-the-fly
    c. All Stop
    d. Power Reset
    e. Any machine control on assigned machine
    f. Source Cruise for assigned machine.
Indicator 13E—Record Joystick LED Indicator—enabled steady when the record machine is assigned to the joystick, enabled flashing when a Record Cruise Mode is enabled.
Indicators 13F, 13G, 13H—Source Joystick Enable LED Indicators—enabled steady when a specific source video tape recorder is assigned to the joystick—enabled flashing when in the Cruise Mode.
Indicator 13D—Auto Tag LED
  Enable Auto Tag
    1. Flashes when in effect.
    2. Enabled only at end of edit.
  To make use of "Used"
    1. PVW (Auto Edit-In Pt. Load)
    2. Rec. "IN"
    3. Swap IN/OUT
    4. PERF. Edit (Auto Edit in Pt. Load)
  Cancel
    1. Rec. Joy Enable
    2. Rec. "KBD IN"
    3. Rec. Machine Control
    4. PWR Reset
    5. When "Used"
    6. When Source durations defined and Record Out edit point selected (source duration is both In and Out edit points selected)
Replay Pushbutton Switch 13A—Illuminated Double Width Button.
  Enabled (Pulsing)
    a. End of Edit
    b. End of Replay
  Activated (only when Pulsing)
    Goes Steady when depressed and enters Replay cycle.
  Replay Cycle
    a. Cue at 2 times real speed to approximately 3 seconds before in Edit Point.
    b. Play at real time to approximately 1 second past end of Edit (Out Edit Point)
  Canceled (Lamp Off) By
    a. All Stop
    b. Preview Edit
    c. Power Reset
    d. Record Joystick Enable
    e. Perform Edit
    f. Record Machine Control
    g. Record Search
    h. Record Out Edit point selected on-the-fly
Perform Edit Pushbutton Switch 13B
  Illuminated button (Steady and Pulsed)
  Conditions for use (locked out all other conditions)
    a. Preview Pulsing
    b. Preview Steady
  When conditioned and depressed simultaneously with Preview Edit button enters Perform Edit cycle.
  Perform Edit Cycle
    a. Cue back (Adj. Cue 10/5/2) 2×speed to Cue Point
    b. Pre-Roll (same distance as due but at normal speed)
    c. Insert (as defined by In/Out Edit Points)
    d. End Edit (as defined by Out Edit Point or Manual Command)
    e. Edit Post Roll (1 sec.) (run-on)
  Lamp Pulsing During
    a. Cue Back
    b. Pre-Roll
  Lamp Steady During
    a. Record duration
  Cancel (Lamp Off)
    1. Perform Edit button
      a. If Pulsing reverts to Preview cycle
      b. If Steady causes End of Edit (use reaction time correction except in Cut-Lap Out or Both)
    2. All Stop (causes End of Edit)
    3. Power Reset (causes End of Edit)
    4. Machine Control of any machine involved in Edit cycle
    5. Start of Edit Post Roll cycle (run-on)
Note: Except for A/B Rolls the Source to be used in the Edit must be selected before going into a Perform Edit. If Record is selected Preview lamp goes out and the system will not go into a Perform Edit.
13C - Preview Edit Button Switch, Illuminated
  I. Off to Pulsing
    a. Any Joystick Enable
    b. Any Edit Point selected (Insert or Full Keyboard options)
  II. Steady to Pulsing
    a. End of Post Roll Review cycle
      1. End of normal Preview cycle (including VBV and BVB)
      2. PVW button depressed when Steady
    b. All Stop
    c. Play, (Record on VBV, Source on BVB), All machines involved in PVW.
    d. Search with Time Code
  III. From Pulsing to Steady (enters PVW cycle)
    a. Depress PVW button
  IV. From Pulsing to Off
    a. Cancel all Edit points (Insert or Full Keyboard)
    b. Perform Edit
    c. Machine control (except Play) of All machines involved in Preview
    d. Power Reset
    e. Search with CTL
    f. 4 Edit Points (non A/B Roll), too many Edit Points (A/B Roll)*

*"Too many" means Record In, Out and "To" Machine In, Out. "From" In or In, Out is all right.

V. From Steady to Off
  a. Perform Edit
  b. Machine control (except Play) of All machines involved in Preview
  c. Power Reset
  d. Search with CTL.
VI. Off to Steady
  Pre-Edit (Perform Edit Pulsing Ref. No. 30) and Perform Edit depressed.
  This only happens if Pre-Edit is in cycle where PVW lamp would be normally Steady.
VII. Preview Edit Cycle
  a. Cue back from Edit point to Cue point
    1. Location of Cue point defined by Preroll switch
    2. PVW lamp Steady
    3. 2 Times Speed
  b. If not at Edit point to Cue point
    1. Location of Cue point defined by Preroll switch
  c. Pre-Roll
    1. PVW lamp Steady
    2. Machines locked to Ref. time
  d. Insert time
    1. Duration between In Edit points and Out Edit points with respect to Record machine (duration Record machine is in Record)
    2. If no Out Edit points are defined insert time for Preview is (0) zero.
    3. PVW lamp is Steady during insert time
  e. Post Roll
    1. Post Roll is period after insert time and until machine stops.
    2. PVW lamp steady
    3. Post Roll is equal to Preroll duration
    4. Zero insert shows Source Video during Post Roll.
    5. Non-Zero insert shows Record Video during Post Roll.
  f. Re-Cue
    1. Re-Cue is period between end of Post Roll and In Edit Point.
    2. PVW lamp Flashing
    3. Speed 2x (except condition VII, b, 2.), prevails on Re-Cue also.
  g. End of Preview Cycle
    1. End of Re-Cue (In Edit Point)
VIII. Automatic In Edit Point Selection
  A. Preview button depressed when Flashing will load in Edit Points.
    1. Record Machine
      a. If no In Edit Point and Auto Tag lamp flashing will load last Out Edit point.
      b. If no Edit point and Auto Tag not flashing will load Record timer.
        1. In Joystick still
        2. On-The-Fly (Play uses reaction time correction Joystick or Cruise).
      c. Special Case (Non-A/B Roll situation)
        1. If source In and Out Edit points selected (either Audio or Video) and a Record Out Edit point and No Record In Edit point selected, Preview will not load Record In Edit point. In the case of A/B Rolls 3 or 4 Source Edit points are required.
      d. Zero Cruise Preview
        1. If Record Machine is in Zero Cruise, PVW will load (based on above conditions) and cancel Cruise.
      e. All Auto In Selects are for Both Audio and Video.
      f. Re-Preview loads only if Record has been Joystick enabled since last Preview, or if Edit points cleared.
    2. Source Machines
      a. If no In Edit point is selected, the system is not in an A/B roll condition, and there are not Record In, Out and Source Out Edit points selected. The PVW button will load Source In Edit point in still or on-the-fly (in Play uses reaction time correction Joy or Cruise).
      b. In A/B Roll condition the Preview button will never Auto load edit In points.
      c. Zero Cruise will cause a still frame edit and therefore, there is no Source Out Edit point. The In Edit point may be auto loaded but preview does not move Source machine.
      d. All Auto In selects are for both Audio and Video
      e. Re-Preview Auto loads only if Source has been Joystick enabled since previous Preview, or if In Edit points cleared.
Note: Except for A/B Rolls the Source to be used in the Preview must be selected before Previewing. If Record is selected Preview lamp goes out and the system will not Preview. Once in the Preview cycle Any Machine may be selected but upon return to In Edit Point the Above condition is re-established.

Figure 2A:
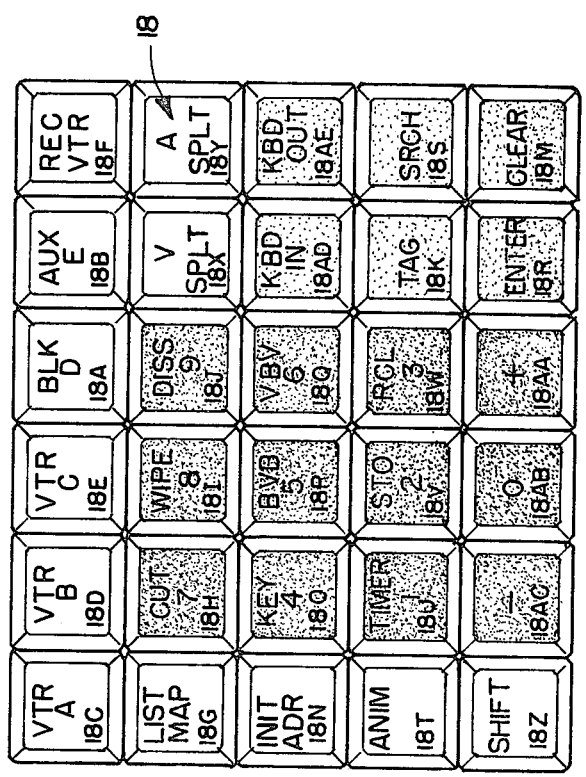
FIG. 2A is a schematic representation of the various components which are included in the option control panel of FIG. 1A.

In the keyboard option of FIG. 1A, the panel 12 of FIG. 2 is replaced by a panel 12A which includes the same joystick and other operating controls, but which also includes keyboard 18. The various keys on keyboard 18 are shown in FIG. 2A. The keyoard provides the capability of controlling more than one source video tape recorder, and provides a variety of additional functions. The keyboard is used in conjunction with a status display character generator and a display cathode-ray tube. The keyboard option is descried in detail in Copending Application Serial No. (K-2137).

The following is a brief description of the buttons 18A-18AE of keyboard 18, as shown in FIG. 2A:

BLACK BUTTON 18A (Top Row Button)
  Illuminated (Steady or Off)
    Illuminates when depressed and clears all other top row buttons.
    Extinguished by any other top row button.
    Used to Assign Black Signal To
      a. Preview
      b. Perform Edit
      c. Would cause VBV in Normal Preview
        Also used for Alpha entry of "D" for reel assignment.

"AUX" BUTTON 18B (Top Row Button)
  Illuminated Button (Steady or Off)
    Illuminates when depressed and Clears all other top row buttons.
    Extinguished by any other top row button.
    Used to Assign Aux. Input to
      a. Preview
      b. Perform
    Also used for Alpha entry of "E" for reel assignment.

SOURCE VIDEO TAPE RECORDERS BUTTON
A/B/C 18C, 18D, 18E (Top Row Buttons)
  Illuminated (Steady or Off)
    Illuminates when depressed and clears all other top row buttons.
    Extinguished by depressing any other top row button or for reel assignment during initialization.
    Used to Assign Source Machine to
      a. Preview
      b. Search
      c. Perform Edit
      d. Timer Set
      e. In/Out Edit Point Selection
      f. Tag In/Out
      g. Trim
      h. BVB Preview
      i. Joystick Pre-Delegation
      j. A/B roll Use
      k. STO (When Keyboard CLR)
    VTR Becomes Unassigned
      a. End of Function (Edit, Search, etc.)
      b. New Joystick Del. or Cruise (For Joystick)
      c. New A/B Machine Selection (A/B Roll)
    Also used for Alpha entrys "A, B, or C" for reel assigment.
RECORD BUTTON 18F (Top Row Button)
  Illuminated (Steady or Off)
    Lamp activated any time depressed. Cancels all other top row lamps when activated. Extinguished by any other top row button.
    When Activated (lighted) Delegates Keyboard for
      a. Search
      b. Auto Tag in Edit Point (if Auto Flashing)
      c. Tag In/Out
      d. In/Out Edit Points (from Timer, or Keyboard Entry or On-The-Fly including Vsplit/Asplit Points)
      e. Timer CLR or Set (From Keyboard Entry)
      f. STO of Record Timer
      g. Trim
    Inhibited By (Does Not Extinguish Lamp)
      a. Auto Mode (Search, PVW, PERF)
    Also used for Alpha entry of "F" for reel assignment.
"LIST 18G (OPTIONAL)"
  Alternate Action Illuminated
    When Enable causes data to be transmitted to Tape Punch or other Readout devices.
    Date is transmitted at the end of each End Edit
    Data to be Compatable with the generally accepted (unofficial) "Automatic Assembly" industry standard.
    The only exception is Field 9, which will always be Record Stop Edit and Not Duration
    Button Cancelled By:
      a. List
      b. Power Reset
"CUT/7 BUTTON" 18H Used to Enter "7" to keyboard register
  CUT Button (Shift-7) Used to Start Sequence of A/B Roll in Cut Transition
"WIPE/8" BUTTON 18I Used to enter "8" to keyboard register
  WIPE Button (Shift 8) for A/B Roll
"DISS/9" BUTTON 18J Used to center "9" to keyboard register
  DISS Button (Shift 9) for A/B Roll "TAG" BUTTON 18K (Manual Tag)
  Non-Illuminated.
    Transfers Out Edit point from Previous (last performed) edit of machine selected by top row button to In Edit point for next edit of machine selected.
    If top row button is Black or AUX., will beep and do nothing.
    If no previous Edit was performed, data entered may be invalid.
    In Edit point prior to Tag is discarded and second depression of Tag button will load Timer data for In Edit point. If Tag is again depressed previous Edit point is again entered.
    After an End Edit

| | |
|---|---|
| 1st Depression Last Out → | New In<br>Old In → Lost |
| 2nd Depression Timer → | New In<br>Old In → Lost |
| 3rd Depression Last Out → | New In<br>Old In → Lost |

"CLEAR" BUTTON 18M (CLR), Non-Illuminated
  a. When Depressed Will Clear
    1. Keyboard
    2. Any Prefix (V/Asplit, SHIFT for STO/RCL)
  b. With Keyboard Clear, Function Buttons Cause Clear For
    1. Search (Return to Joystick Pause)
    2. Timer (Set to Zero)
    3. KBD IN/OUT (Clear Edit Points)
  c. SPECIAL CASE. If Keyboard is Clear STO will Store selected Timer Data.
INIT/ADR PUSHBUTTON 18N (Automatic Dialogue Replacement)
  (Shifted Function)
    Automatic after Power Reset
    Manual with Shift, "+"
    Causes Prompt
      1. Event Number (Max. 3 digits)
      2. Assignment of Reel Numbers (Max. 3 numeric and 1 Alpha digit)
      3. Reaction Time (In Frames) (2 digits max)
      4. Show duration (i digits max) CLR=Cancal INIT
      5. Future (undefined), might be used for MP test routine.
    Prompt automatically goes away after last query or CLR.
    Illuminated Alternate Action Button
    Extinguished by ADR Button or Power Reset
    Uses Record machine Only
    Makes Audio Edit Only (A1 & A2 unless manually changed)
    ADR Automatically causes 5 sec. Cue regardless of Pre-roll switch setting.
    Operation:
      When PVW and PERF buttons depressed simultaneously starts looping cycle which cues back (2X speed) from In Edit point (PERF-Flashing), Pre-Rolls (PERF-Flshing), beeps three times at 1 second increments and goes into Record (PERF-Steady) 1 second after last beep. Records thru End Edit point, Post Rolls 1 second reverses (2X speed, PERF-Flashing) to In Edit point and automatically repeats cycle continuously. Cycle will revert to Normal* cycle when ADR depressed. Replay pulses whenever PERF Edit is pulsing. Depressing Replay causes a Replay cycle.
*Normal Cycle: If Performing an Edit goes to Perform Edit cycle, If not Performing an Edit goes to PVW cycle.

Depressing PERF during Edit causes run on and stops looping.
    Depressing PERF when Pulsing causes return to In Edit point and stops looping.
    If no Out Edit point, PERF Edit is inhibited.

NOTE: 1 sec=30 frame 60 Hz, 25 frame 30 Hz.

"KEY/4" BUTTON 18O
  Non-Illuminated
  Used for Keyboard Register Entry of "4"
  KEY Button ("Shift""4")
    Used to Start Sequence of A/B Roll in Key Transition.

"BVB/5" BUTTON 18P and "VBV/6" BUTTON 18Q
  Non-Illuminated
  Used for Keyboard Register Entry of "5" and "6" respectively
  BVB (Shift 5) Black-Video-Black Preview
    When Source selected uses only Source machine but places Record machine in E-E Mode.
    Requires Black Source and Video Switch.
    Follows other rules of Preview.
  VBV (Shift 6) Video-Black-Video Preview
    Used only Record machine and Black signal.
    Requires Black Source and Video Switch.
    Follows other rules of Preview.
  Insert requires a definable duration.
    For RECORD
      1. In and Out Edit Points for Record machine.
      2. In or Out Edit Points for Record and In and Out of last Source (A, B or C) selected (Source A/B/C).
    For SOURCE
      1. In and Out Edit Points for Source machine.
      2. In or Out Edit Points for Source and In and Out on Record.

"ENTER" BUTTON 18R, Non-Illuminated
  a. Used to Enter Answers to CRT Prompting Questions

| Yes = 1 or a Clear Keyboard | Unless Numeric Answer Required |
|---|---|
| No = 0 | | b. Initialization
  c. A/B Roll (Caused by Cut, Wipe, Diss or Key Transition)
    1. Defines Last Used Source
      Applicable (Any Edit Performed Since Last Power Reset)
      Asks Which "From" Source To Be Used.
      To Answer Select Source Button On Top Row and Depress Answer (Background on Key)
    2. Asks for "TO" Source.
      Select Source On Top Row and Depress Answer (Foreground on Key)
    3. If Transition is Cut Questions are Terminated with a Ready Instruction.
      If Transistion is Wipe Asks for Type of Wipe. Answer with 3 Digit Wipe Code.
      If Transition is Wipe and Type has been Entered or Transistion is Dissolve, Asks for Duration of Transition. Answer in 3 Digits (000 to 255 frames) Terminates when Ready.
      If Transition is Key Asks if Key is OK.
        Answer "CLR-ENTER" or "(1) ANS" if Ok.
        Answer "O-ENTER" for a Key Out.
      Asks for Delay between Background On and Foreground On.
      Answer 3 Digit Delay (Frames) 255 Max.
      Asks if "Fade On" is OK.
      Answer Yes if Background is to Fade to or From Black. No if Background is to Cut In or Out.
      Asks for Duration:
        Pops Foreground In if Zero.
        Duration Applies to Both Foreground and Background if Fade is Requested.
      Answer 3 Digits (0–255 Frames)
      Terminates With Ready NOTE: If any A/Vsplit Edit Points are Loaded any attempt to go into A/B Roll condition will Beep and be inhibited.

Shift-Enter. Cancels all A/B Roll Functions.
  (Take you back to Normal non-A/B Roll condition).

"SEARCH" BUTTON 18A
  Non-Illuminated
  Requires minimum of one digit in keyboard
  Keyboard entry in hr., min., sec., fr.
  Locked out if machine assigned to Auto functions
    a. Preview (if CTL)
    b. Search
    c. Edit SEARCH CANCEL
  a. CLR-Search (With machine to be halted selected on top row (CLR=Clear Keyboard)
  b. Any machine control for Searched machine
  c. All Stop
  d. Power Reset
  e. Search compare CONDITION WHEN CANCELED
  a. To machine Stop for All Stop, Power Reset.
  b. To Joystick Pause (Joystick not enabled) for Compare and CLR.
  c. To whichever machine command was issued for machine control ANIMATE BUTTON 18T (OPTION)
  Illuminated (Steady or Off)
  Alternate Action Only (no effects from other buttons or MP except Power reset will Cancel)
  When First Enabled
    a. Prompt Question (If answer has been entered continue normal operation.
      1. Local or Remote (Remote requires R.C. Panel) Answer "1" for Local, "2" for Remote
      2. Number of Frames Per Record (1–9)
      3. Automatic Control (Yes=1 or CLR, No=$\phi$)
  Normal Operation.
    a. Manual
      Each time PVW-PERF button depressed Rec will Auto Tag and record pre selected number of frames using source selected on top row. Halt and Flash Auto Tag.
    b. Automatic
      One cycle is started, as in Manual control, a signal will be issued to Animate Table at the end of Record cycle. The Edit will wait for a resume command before entering new Record cycle.
      The output signal may be used as the resume command to allow a continuous cycle. This cycle may be interrupted by opening the resume command or depressing Perform Edit when Flashing (may be depressed when Steady but this will cause an End of Edit at the time depressed), or any other button which would normally end an Edit cycle.

Remote Control

Remote Control panel allows entry of number of frames, manual or automatic operation, has the equivalent of a perform Edit button, (Single button operation) and Record and Stand By (Ready) status indicators. Operation is the same as manual or automatic operation previously described.

"Timer/1" BUTTON 18U
"STO/2" BUTTON 18V
   Non-Illuminated
   Used for Keyboard Register Entry of "1" and "2" respectively.
TIMER (Shift-1) Timer CLR or Set
   Used to set Timer of machine selected by top row button (beep and ignor BL/AX)
   If Keyboard Clear or $\phi$ will set Timer to $\phi$ Will Transfer up to 8 digits (HR, M, S F) to Timer with Right Justify and Units Carry correction including drop frame if applicable.
STO (Shift-2) Used to Store Keyboard Entry or Timer (of selected machine if Keyboard is Clear) to a storage register (will beep and ignor BL/AX if Keyboard Clear)
   When Shift-STO depressed shift will flash upon entry of 2nd digit of storage address data is stored and shift extinguishes.
   Storage location 00 is automatically loaded with data removed from display by a beep.
NOTE: 1 used as Yes answer for Prompt.
"RCL/3" BUTTON 18W
   Non Illuminated
   Used For Keyboard Register Entry of "3"
RCL (Shift - 3) Recall Used to Recall data from storage Registers when shift-RCL depressed Shift Lamp Flashes Upon Entry of 2nd Digit of Storage Register address data is placed in Keyboard Register (data is retained in Storage Register), Shift Lamp is extinguished. This data may be used in the same way as any Keyboard Register Entry (Edit Points, Search, Timer Set, etc.)
"V/SPLIT" BUTTON 18X
"A/SPLIT" BUTTON 18Y
"Vsplit" Illuminated Button (Video Split)
   Used to Enter Video Only Edit Points
   Is a Prefix to In/Out Points
   Illuminates when depressed (Flashing)
   Extinguished By:
      a. Vsplit (not entered)
      b. In/Out (Entered)
      c. CLR (not entered)
      d. All Stop (not entered)
      e. Power Reset (not entered)
      f. PVW-PERF (entered if not previously entered)
      g. Search (not entered)
Asplit same as Vsplit except for Audio Split Entries.
NOTE: If in A/B Roll condition A/Vsplit will Beep and be inhibited. If A/Vsplit is loaded any A/B Roll instruction will be beeped and inhibited.
"SHIFT" BUTTON 18Z
   Illuminated (Flashing or Off)
   Used for All Shift Operations
      a. Cut
      b. Wipe
      c. Dissolve
      d. Key
      e. BVB
      f. VBV
      g. Timer
      h. STO
      i. RCL
      j. INIT
      k. KBD In
      l. KBD Out
      m. ENTER (Used to cancel A/B Roll condition)
   Illuminates ONLY with STO and RCL.
   (Used as Prefix for 2 digit Address)
   Extinguishes:
      a. When Used (After 2 Digits)
      b. All Stop
      c. CLR
      d. Power Reset
      e. Automatic Modes
NOTE: Must be held down and shifted key depressed for use.
"+" BUTTON 18AA
"+TRIM" (Positive) Prefix Causes "+Trim" to be placed on CRT next to Keyboard.
   Requires min. 1 digit max. 3 digit entry (frames)
   Adds # frames to IN or OUT Edit point (on VTR selected) when "IN" or "OUT" Depressed.
   Causes Beep if Black of AUX. selected, but does not destroy entry.
   CLR with Power Reset or All Stop or CLR.
   IN/OUT does not clear Keyboard.
"O" BUTTON 18AB
   Non-Illuminated
   Used for Keyboard Ergister Entry
   Used for No Answer to CTR Prompt*
   *(Requires ENTER Button Entry)
"−" BUTTON 18AC
   Non-Illuminated Prefix−Trim (Negative)
   Causes "−Trim" to be placed on CTR next to Keyboard Readout.
   Requires Min. 1 Digit Max. 3 Digit Entry (In Frames).
   Subtracts # Frame from In or Out Edit Point (on Selected VTR)
   Causes Beep if BLK/Aux. selected But does not destroy entry.
   CLR Trim with Power Reset or All Stop or CLR.
"KBD/IN" BUTTON 18AD
   Non-Illuminated.
   Used to Load IN Edit Points, on Machine Selected (BL/AX Beep Only), from the Machines Timer. This may be done in Still Frame or On-The-Fly (Play with Reaction Timer Correction, Joystick, Cruise).
   Will Load and Extinguish Record Auto Tag if On.
KBD IN (Shift IN)
   Used to Load IN Edit Points on Machine Selected (BL/Ax Beep only) from Keyboard Entry. If Keyboard is Clear Will Clear In Edit Point
   (Only other way to Clear In Edit Point is to Perform an Edit.)
"KBD/OUT" BUTTON 18AE
   Same as "IN" Except Used to Load Out Edit Points. When used to Load Out Edit Points On-The-Fly will place machine in Joystick Pause. Has no Effect On Auto-Tag.

KBD OUT (Shift OUT) Same as KBD IN Except Used For Out Edit Points.

NOTE: In non A/B Roll conditions: A maximum of 3 Edit Points may be used in a non A/B Roll. If a Fourth is entered it will Beep and load but the Preview lamp will extinguish. One Edit Point must be cleared to re-establish the Preview.

In the option of FIG. 1B, the control panel 12 of FIG. 2 is replaced by a control panel 12B. Control panel 12B includes the same joystick controls, and other controls of the panel 12 of FIG. 2, and also includes additional controls which permit the operator to provide in-and-out edit points for both the source and record video tape recorders, and to perform trimming operations. The details of these controls are shown in FIG. 2B.

The control panel of FIG. 2B includes an Edit Select pushbutton switch for the record video tape recorder, designated 20A, an Edit Select pushbutton switch for the source video tape recorder designated 20B, an "IN" pushbutton switch designated 20C, an "OUT" pushbutton switch designated 20E, an LED indicator for the "in-edit" point of the record video tape recorder designated 20F, an LED indicator for the "out-edit" point of the record video tape recorder designated 20G, an LED indicator for the "in-edit" point of the source video tape recorder designated 20H, an LED indicator for the "out-edit" point of the source video tape recorder designated 20I, a pushbutton switch for trimming in the forward direction designated 20K, a pushbutton switch for trimming in the reverse direction designated 20L, a CLEAR pushbutton switch designated 20M, a Timer pushbutton switch designated 20N, and an ADR accessory key pushbutton switch 20P. A two digit LED seven-segment display 20Q is also included, with appropriate set buttons 20R and 20S to set the two digits to the desired number of frames to be trimmed.

The display 20Q represents the number stored in the trim register, and any number can be set in the register by the two set buttons 20R and 20S. The pushbuttons 20L and 20K determine whether the trim is to be positive or negative. The timer pushbutton 20N controls an optional timer which has its own LED display, and the timer is also controlled by the pushbutton 20K. The CLEAR pushbutton 20M is used to clear the timer or to clear edit points.

The Edit Select controls include pushbutton switch 20A which, when operated, selects the record video tape recorder, and the pushbutton switch 20B which, when operated, selects the source video tape recorder. The in-and-out edit points are selected by the pushbuttons 20C and 20E, designated respectively "IN" and "OUT".

The following are the specifications for the controls 20A-20N of FIG. 1B:

"EDIT SELECT RECORD" BUTTON -20A-
 Illuminated (Steady or Off)
 Activated by depressing.
 Extinguished by depressing Source Button.
  Used for:
   A. Setting Record In/Out Edit Points from
    1. Auto Tag (In only)
    2. On-The-Fly in Play with reaction time correction, Joystick or Cruise.
    3. Still frame from Tape Timer.
   B. Delegate Trim Register to Record Edit Points
   C. Delegate Timer set to Record Timer
   D. Delegate CLR to Record Edit Point CLR or Timer CLR (Set to Zero)

"EDIT SELECT SOURCE" BUTTON -20B-
 Illuminated (Steady or Off)
 Activated by depressing
 Extinguished by depressing Record Button
  Used for:
   A. Setting Source I/Out Edit Points from
    1. On-The-Fly in play, Joystick or Cruise
    2. Still frame from Tape Timer
   B. Delegate Trim Register to Source Edit Points
   C. Delegate Timer Set to Source Timer
   D. Delegate CLR to Source Edit Point CLR or Timer CLR (Set to Zero)

"RECORD IN" INDICATOR (LED) -20F-
 A. Condition when Pulsing
  Record Select Enabled, No Record in Edit Point Selected and All three other Edit Points (Source In, Out, and Record Out) not selected. (Any two may be selected.)
 B. Condition when Steady
  Record In Edit Point loaded (Record Select button need not be enabled).
 C. Condition when Off
  1. Record Select not Enabled and no Record In Edit Point Selected.
  2. Record Select Enabled and all three other Edit Points Selected.

"RECORD OUT" INDICATOR (LED) -20G-
 Same as IN except used to indicate Out Edit Points and all three other Edit Points means Source In, Out and Record In Edit Points.

"IN" BUTTON -20C-
 Not Illuminated.
  Used to load In Edit Points
   A. Record Auto Tag
   B. Tape Timer
    1. On-The-Fly (Play with reaction time correction, Joystick, Cruise.)
    2. Still Frame
  If 3 Edit points are set in will beep and load the Edit Point if a 4th point selected. The Preview lamp goes off until one edit point is cleared.

"OUT" BUTTON -20E-
 Not Illuminated.
  Used to load out Edit Points from Tape Timers.
   A. On-The-Fly (Play with reaction time correction, Joystick, Cruise), loading Out Edit on-the-fly causes Joy pause.
   B. Still Frame
  If 3 Edit points are selected will beep and load Edit point if a 4th point is selected. The Preview lamp goes off until one edit point is cleared.
NOTE: Also used to enter Trim Readout if "+" or "−" is on. Entry sets "+" and "−" to off.
Other override conditions:
 Any pair of Edit Points (In and Out) resulting in a zero or negative (Out before In) duration will beep, and not load entry. Any Edit Point loaded where Edit Point has previously been loaded will Clear old load new and not beep.

"SOURCE IN" INDICATOR (LED) -20H-
 Same as Record IN Indicator Except for Source. All three other Edit Points means Record In, Out and Source Out.

"SOURCE OUT" INDICATOR (LED) -20I-

Same as Record OUT Indicator except for Source. All three other Edit Points means Record In, Out and Source In.

"TRIM+" BUTTON -20K-
 Illuminated.
  Used to Cause:
   A. "+" Trim if "+" button is on.
   For Timer Operation (Timer Button Illuminated) see Timer Button 20N.
   In/Out buttons transfer Readout data to correct Edit points and that causes "+" or "−" button to go off.
   Anytime the "+" or "−" button is on:
    1. In or Out will cause transfer and clear button.
    2. The Clear (CLR) button will clear button.
   "−" button will cause "+" button to go off.

"TRIM−" BUTTON -20L-
 Illuminated.
  Same as "+" Trim except used for "−" Trim.
  "+" Button will cause "−" button to go off.

"CLEAR (CLR)" BUTTON -20M-
 Illuminated (Flashing or off)
  Illuminated when depressed
  Used (When Illuminated):
   A. CLR In (Out Edit points on Record or Source)
   B. Will CLR Timer when Timer Enabled
  Cancel Illumination
   A. CLR (Alternate Action)
   B. Used (As above)
  Used (When not illuminated)
   A. If Timer Enabled (Lamp Steady) CLR will clear timer Selected by Record/Source and NOT illuminate.
   B. If Timer Enabled after CLR illuminated Timer will clear and CLR will cancel.
   C. If Trim Buttons ("+" or "−") on will clear Trim Button to off and NOT illuminate.
NOTE: If CLR illuminated when TRIM "+/−" depressed will only cancel CLR, and have no effect on Trim.

"TIMER" BUTTON -20N-
 Alternate action illuminated.
 Activate by depressing (on steady)
 Deactivate by depressing or Power Reset.
 When 1st depressed decimal appears to left of M.S.B. (hours tens) digit. Depressing and holding down "+" key causes digit to advance at a rate of approximately once per second. No carry is generated to the next higher digit. Upon releasing the key the digit stops advancing and the decimal moves to the next lower digit. The decimal is therefore a cursor for identification of which digit is to be advanced when the "+" key is held down. If the "+" key is only momentarily depressed (less than 1½ seconds of hold down) the decimal will move one digit to the right each time the key is released. The "−" key may be used to move the decimal to the left but does not cause the digit to advance or change. When the Timer button is turned off the decimal point is extinguished. If a Character Generator is present some form of a cursor is used instead of a decimal point.

2 DIGIT LED DISPLAY -20Q-
 Used only to display TRIM Pre-Set Value
 Counter Feeds Port to Microprocessor
  Each digit has individual set button to set digit to desired number of frames for Trim by increasing automatically at approximately 2 per second, when Set button is depressed.

In the operation of the system thus far described, audio and video signals are typically routed directly from the source video tape recorder 30 to the record video tape recorder 32, as shown in FIGS. 1 and 3. Audio monitoring facilities may be provided in the unit with an internal speaker/amplifier, the audio monitor volume being controlled by the potentiometer 16F of FIG. 2. The unit is turned on by means of a two-position on/off toggle switch (not shown) located on the back panel of the unit. Application of power resets all operating modes of the components of the system in a neutral state and clears all registers. The joystick circuit is undelegated when the unit is first turned on, and all controlled video tape recorders remain in whatever condition they were when power was turned on.

The pushbuttons 16A, 16B, 16C and 16D constitute remote control buttons for the source video tape recorder 30; and the pushbuttons 16H, 16I, 16J, 16K and 16M constitute remote control buttons for the record video tape recorder 32. Tape motion control of the video tape recorders can be accomplished by actuating the remote transport button controls, that is, Fast Forward, Rewind, Stop, or Play. Any of the above commands will cancel the joystick delegation control and status indication for that video tape recorder.

As mentioned earlier, when the system is in the joystick mode, pushing the joystick 22 fully upward, that is away from the operator, will delegate the joystick to the record video tape recorder and illuminate the record video tape recorder status LED 13E. Then, deflecting the joystick to the right will cause the tape of the record video tape recorder to move in the forward direction. The rate of motion is continuously variable depending upon the degree of joystick deflection, and the speed is logarithmically graduated from still frame up to the maximum speed recommended for the specific video tape recorder. Deflection of the joystick to the left will cause the tape of the record video tape recorder to move in reverse in the same manner.

Pulling the joystick fully down, that is, toward the operator, will delegate the joystick circuit to the source video tape recorder 30. This action will de-energize the Record Video Tape Recorder Joystick Status LED 13E, and illuminate the Source Video Tape Recorder Status LED 13F, and allow the joystick circuit to control only the source video tape recorder. The joystick controls only one video tape recorder at any one time. Delegating the joystick circuit to the record video tape recorder will lock out the source video tape recorder, and vice versa, with the status indicator LED's 13E and 13F following suit.

As described, control panel 12 has three source video tape recorders status LED's 13F, 13G and 13H, labelled "A", "B" and "C". In the basic configuration, only the "A" source video tape recorder status LED 13F will be functional. With the addition of the option of FIG. 1A, the multi-machine keyboard 18 (FIG. 2A) controls the selection of three source video tape recorders, by its button 18C, 18D and 18E, and the LED's 13F, 13G and 13H are selectively illuminated to designate which source VTR machine is selected at any particular time.

Cruise control is a special mode involving tape motion at a programmable fixed speed. When the joystick 22 (FIG. 1) is delegated to a video tape recorder and deflected to cause forward or reverse motion at a certain speed, including still frame or zero cruise, desired by the operator, that speed can be maintained indefinitely by depressing and releasing the cruise set pushbutton 22a (FIG. 1) on the top of the joystick knob. The cruise mode cancels the joystick delegation to that video tape recorder. In order to reset cruise to a different speed on the same video tape recorder, the joystick must be re-delegated to that video tape recorder, the desired speed selected, and the cruise set button 22a depressed and released again. The cruise mode should be activated when the cruise set button is released, not when it is depressed. The cruise mode can be cancelled on any video tape recorder by redelegating the joystick to that video tape recorder resulting in a joystick still frame (assuming no joystick deflection), or activating any remote or local transport control associated with that video tape recorder. It should be possible to cruise any one or all video tape recorders simultaneously. Activating an automatic edit cycle such as PREVIEW or PERFORM cancels the cruise mode.

The cruise status on any video tape recorder will be indicated by flashing the joystick status LED (13E, 13F, 13G or 13H) for that video tape recorder. If cruise is cancelled with a joystick mode redelegated, the corresponding joystick status LED will change from flashing to a steady state. If cruise is cancelled with a stop or all stop, the joystick status LED will become extinguished. If cruise is cancelled with a fast forward or rewind command, the joystick status LED will also be extinguished.

The specifications for the cruise mode are as follows:
Enabled when Button 22A depressed Joystick 22 must be Enabled.
Disables Joystick when Enabled Cancelled:
1. Re-Enable Joystick
2. All Stop
3. PWR Reset
4. Loading Out Edit Point
5. Machine Control
6. Preview (Will Load In Point if None LOaded) Except Source Zero Cruise.

SPECIAL CASE: ZERO CRUISE

Used on Source Machine to Define a Still Frame Edit.

The unit of the invention, as shown in FIG. 2, includes an ALL STOP pushbutton switch 16G, one set of remote transport control pushbutton switches (16H-16M) to control the record video tape recorder; and one set of remote pushbutton switches (16A-16G) control any one of three source video tape recorders. LED's A, B and C adjacent to pushbutton 16A are individually illuminated to indicate which source video tape recorder is being controlled. In the basic configuration, only the "A" source video tape recorder and the record video tape recorder can be controlled. As indicated, the controls include fast forward, rewind, stop and play. Any of the above pushbuttons, when activated, will prevail over any other command given and will cancel joystick control and delegation, and will also cancel cruise control and automatic search operation on the corresponding video tape recorder. The remote transport controls also take precedence over any automatic edit cycle in which the particular video tape recorder may be involved.

Since certain video tape recorders will not go directly between transport modes without going through the stop mode first, it is desirable for the logic of the system to provide a stop command of the necessary duration to allow the operation to latch the fast forward, rewind, or play command directly by depressing only one pushbutton without having to depress the ALL STOP pushbutton first. The transport controls are momentary contact pushbuttons which are illuminated to provide status indication to the operator of the transport control modes, including stop. Delegating the joystick to a video tape recorder will cancel any transport operation, and will cause that video tape recorder to assume the joystick pause mode, except in the case where the joystick is locked out on video tape recorders moving tape in an automatic edit cycle. The ALL STOP pushbutton 16G will prevail over any other command given, and will cancel all joystick delegation, control and status indication, and any automatic edit cycle.

FIG. 3 is a block diagram of the source video tape recorder 30 and the record video tape recorder 32, and showing an E-to-E switch 35 which is included as a standard component of the record video tape recorder. The monitor 33 is connected to the movable contacts of the E-to-E switch, and the switch is controlled by the edit control system 10, as described in the aforesaid patent. When the switch is placed to the left in FIG. 3, the monitor 33 monitors the video information from the source video tape recorder 30, and when the switch is placed to the right in FIG. 3, the monitor monitors the video information from the record video tape recorder 32.

As shown in FIG. 3, the edit control system of the invention may control the source video tape recorder 30 and the record video tape recorder 32, with the video information on the two recorders being displaced on the cathode-ray tube monitor 33 on a time-shared basis. When the joystick 22 is set to control the source video tape recorder 30, the video information on the source video tape recorder is displayed on the monitor, and when the joystick is set to control the record video tape recorder 32, the video information on the record video tape recorder appears on the monitor.

To operate the editing control system of the invention, the source video tape recorder 30 and the record video tape recorder 32 are activated, and either one of the Play pushbuttons 16A, 16H of FIG. 2, is depressed. This causes the source video tape recorder 30 and the record video tape recorder 32 both to move forward at normal speed, while the video information on the record video tape recorder is monitored by the monitor 33. The normal mode continues until the general location on the source video tape is reached at which its information is to be transferred to the record video tape recorder. Then, either one of the Stop pushbuttons 16B or 16I of FIG. 2 is depressed, or other controls are actuated, to set the system to its joystick control mode. The tapes in the source video tape recorder 30 and in the record video tape recorder 32 may now be individually controlled by the joystick 22. During this mode of operation, the monitor 33 monitors the source video tape recorder so long as the joystick is set to control the source video tape recorder, and monitors the record video tape recorder whenever the joystick is set to control the record video tape recorder.

During the joystick control mode, when an edit frame is selected by the joystick 22, the PREVIEW EDIT pushbutton switch 13C will flash to indicate that it may be operated next. When this switch is operated, either the source video tape recorder or the record video tape recorder are driven in the reverse direction to a predetermined point (Cue Point), as set by the PRE ROLL toggle switch 14F, at which both the source and video tape recorders simultaneously move forward through the selected edit frame, and through a predetermined number of frames beyond the edit frame. Then, the two video tape recorders are automatically reversed, and are returned through the edit frame back to their original IN EDIT points. The two video tape recorders are then automatically stopped at their original IN EDIT points, and the PREVIEW EDIT pushbutton switch remains flashing.

The operation described in the previous paragraph permits a preview to be made of the video information on the source video tape recorder in the vicinity of the edit frame, so that the source video tape recorder may be looked at before the actual transfer to the record video tape recorder is effectuated. At the end of each complete preview cycle, the editor may change the edit frame in either direction by operating the joystick 22, and the preview cycle may be repeated by actuating the preview edit switch once again. However, if after a complete preview cycle, the edit is acceptable, the operator then presses the PERFORM EDIT pushbutton switch 13B and the PREVIEW EDIT pushbutton switch 13C together, and the information from the source video tape recorder is transferred to the record video tape recorder automatically starting precisely at the selected edit frame.

As shown in the block diagram of FIG. 4, the edit control system of the invention includes a digital data bus 100, an analog bus 102, and a control track bus 104. The toggle and pushbutton machine control panels 14 and 16 of FIG. 2, are represented by block 106, and the circuitry associated with the controls is shown in FIG. 6. The auto/joy panel 12 of FIG. 2 is represented by the block 114 in FIG. 4, and the circuitry associated with that panel is shown in detail in FIGS. 7A and 7B. The circuitry of blocks 106 and 114 is connected to a basic board, represented by block 107, and which is connected to both the digital bus 100 and to the analog bus 102. The circuitry of block 107 is shown in FIGS. 8A-8E.

The keyboard panel option of FIG. 1A, or the insert panel option of FIG. 1B is represented by the block 109. Block 109 is connected to the digital bus 100.

The microprocessor, random access memory, and decoding circuitry are represented by block 108. Block 108 is connected to digital bus 100. The circuit details of block 108 are in FIG. 11. The read-only memory (ROM) which contains the microprocessor program is represented by block 110 connected to the digital data bus 100, and the circuit details are shown in FIG. 12.

The audio monitor is represented by block 112, and it also is connected to the digital bus 100.

Figure 9B:
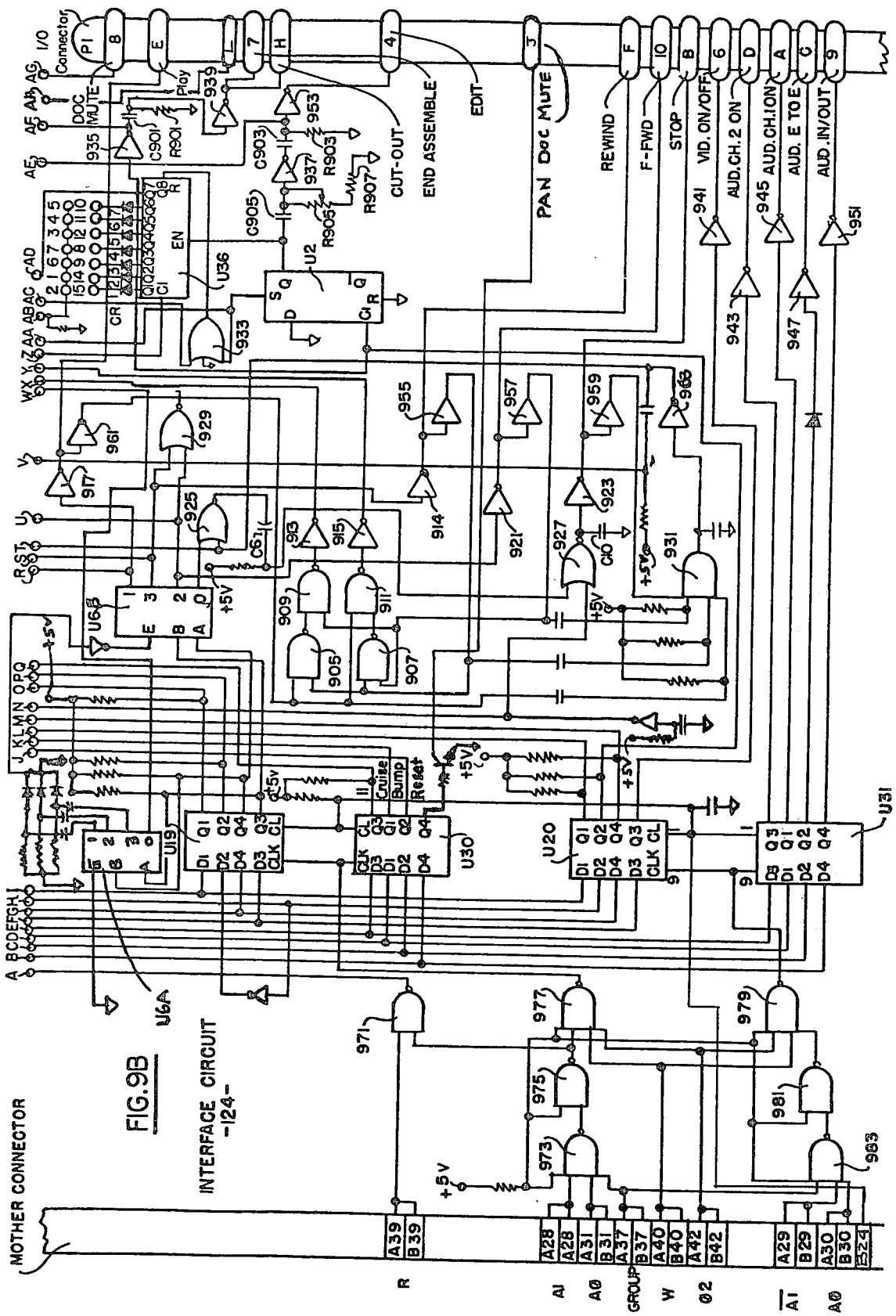
Figure 10:
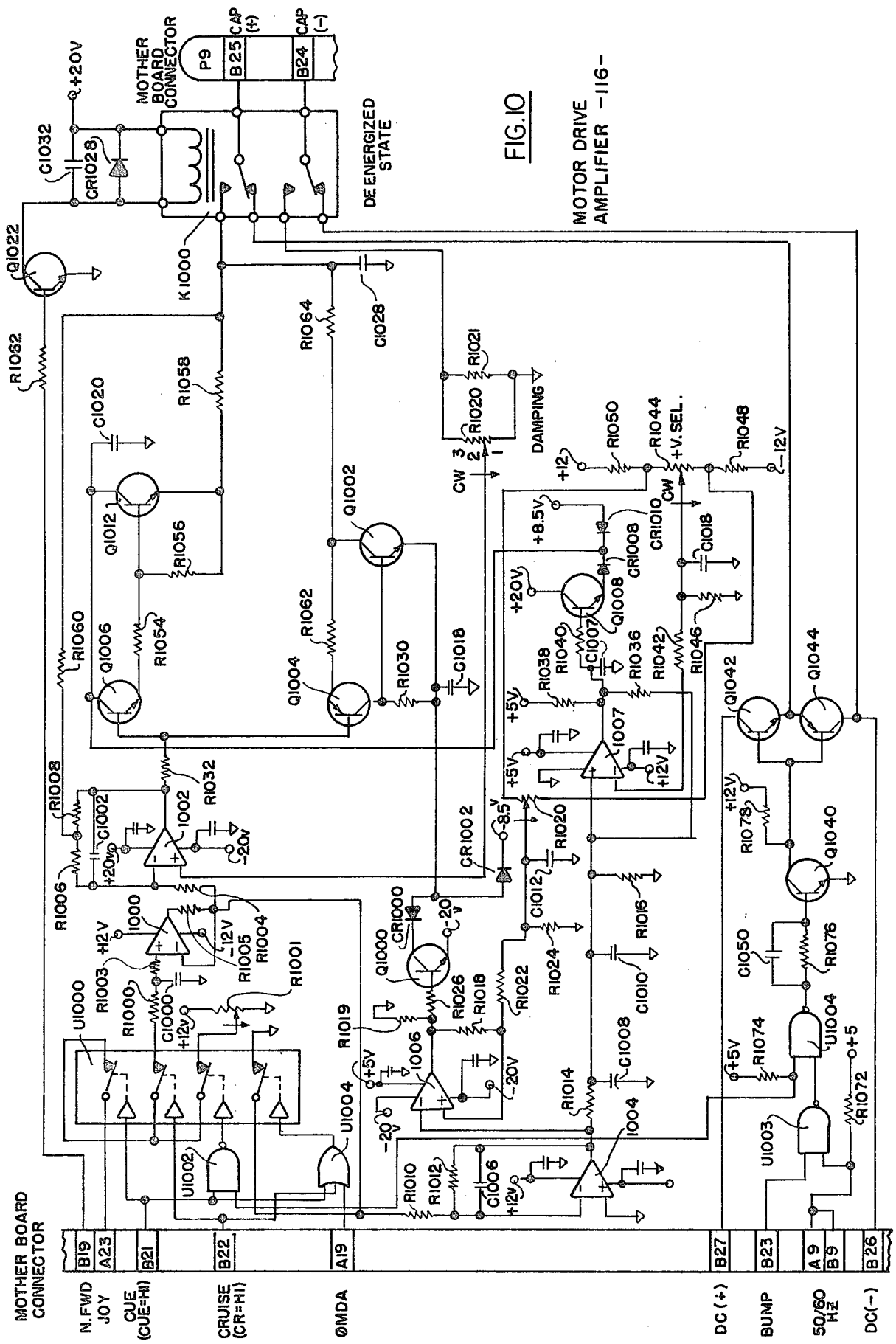

The record video tape recorder interface circuit is represented by block 124 connected to the digital bus 100, and the record video tape recorder motor drive is represented by block 116 connected to the analog bus. Block 124 is also connected to the control track bus 104, and the blocks are interconnected as shown. Circuit details for block 124 are shown in FIGS. 9A and 9B, and circuit details for block 116 are shown in FIG. 10. Similar circuitry for the source video tape recorder is provided, as represented by blocks 126 and 118. In the keyboard option of FIG. 1A, similar circuits for additional source video tape recorders B and C, as represented by blocks 128, 120, 122 and 130 are also connected as shown.

The Cut-Lap circuit discussed briefly above, and described in detail in Copending Application Ser. No. 929,667, is connected to the circuitry of the basic board of block 107. The Lip-Lock circuit described in detail in Copending Application Ser. No. 847,077, and described briefly above, is connected to the audio monitor 112.

The switch 16E in FIG. 2 is a toggle switch with two positions designated "AUTO" and "MANUAL". The AUTO position will cause the audio monitor 112 of FIG. 4 to monitor the record VTR if the editing system is in a preview, perform edit or replay mode. If the system is in none of these modes, and a VTR is joystick enabled, the system will monitor that VTR. If neither of the foregoing conditions are present, the system will determine if the record VTR is in the play mode, and, if it is, the system will monitor the record VTR. If the record VTR is not in its play mode, the system will look to the source VTR. If the source VTR is in its play mode, then the system will monitor the source VTR. If the source VTR is not in its play mode, the system will then leave the audio monitor 112 in the condition it was before it went through the whole cycle. In the MANUAL position of switch 16E, the system will always monitor, in the case of the basic configuration of FIG. 2, the source VTR; and in the case of the full keyboard option of FIG. 1B, the system will automatically monitor the source VTR corresponding to whichever key 18C, 18D and 18E is depressed on the top row of the keyboard 18 of FIG. 2A.

The table of FIG. 5A shows all the data that is on the digital data bus, and sets forth all the addresses which are used, and also defines the corresponding data of each address which is fed into and out of the microprocessor 108 over the data bus.

As the microprocessor addresses all the various control sources of the system during each of its cycles, each control source is addressed in succession, as the addresses in the column designated GP, and addresses are successively generated. As each control source is addressed, it introduces a digital code to the microprocessor on the digit bus corresponding to the state of that source, in accordance with the data codes in the columns designated "INPUT". When a control source has more than two states, the resulting data codes are in accordance with the tables of FIGS. 5B and 5C.

As the microprocessor receives the data codes from the various addressed control sources, it generates commands in the form of binary coded words on the digital bus, in accordance with the codes listed in the columns designated OUTPUT. The tables of FIGS. 5B and 5C contain definitions of the various codes which are used in the upper table. Any indicator in the table of FIG. 5 which indicates more than one data bit and, which, therefore, has more than two states, is further identified in the tables of FIGS. 5B and 5C which show what each state represents.

For example, the address "0" in the upper line of the table of FIG. 5A is a Cut-Lap select on the input function and a Cut-Lap control on the output function. Therefore, the address with the "0" digit in group "0" will select an eight-bit data word. Bit 7 will be the E-to-E defeat switch, bit 6 will be the 50–60 Hertz switch, bits 5 and 4 will be the state of the mode switch 14C in FIG. 2, bits 3 and 2 will be the state of switch 14B, and bits 1 and 0 will be the state of switch 14A. Address 2 of group "0", for example, picks up the key code, data bits 2, 3, 1 and 0, which select the states of all the pushbutton switches 16A-16D, 16H-16M, 12A, 12B, 12C, the cruise control, and others. Also picked up under the key code is the selection of the joystick (source or record VTR), and also the data of the ALL STOP switch 16G.

The toggle switch panel 14 is shown in circuit detail in FIG. 6A, and it includes a toggle switch connector designated J40-A, and the various switches 14A, 14B, 14C, 14D, 14E, 14F, 14G, 14H, 14I and 14J are connected to the designated terminals on the switch connector.

The connections to the various indicators, including the indicators A, B, C of FIG. 2, and the assemble LED 15, are shown in FIG. 6B. As indicated, these lamps are connected to the designated terminals of a lamp connector designated J39-A. Three 200 Ohm resistors R202, R204 and R206 are connected in series with the A, B and C LED's, and with the "Assemble" LED 15.

The pushbutton machine control panel 16 is shown in circuit detail in FIG. 6C. As illustrated, the pushbutton switches 16A-16M of FIG. 2 are connected to the designated terminals of a machine switch connector designated J41-A. The volume control potentiometer 16F is connected to the audio monitor 112 over the indicated leads.

The auto/joy panel 12 of FIG. 2 (block 114 of FIG. 4) is shown in circuit detail in FIGS. 7A and 7B. As illustrated, the joystick 22 is connected to a potentiometer R300, and moves the sliding arm of the potentiometer from a central zero position to upper and lower extreme positions as the joystick is moved from the REV to the FWD positions. Joystick 22 is also connected to a second potentiometer R302, and moves the arm of the second potentiometer from a central position to two extreme positions, as the joystick is moved between the REC and SRC positions.

The potentiometers R300, R302 are connected across the positive and negative terminals of + and −15 volt sources. The movable arm of potentiometer R300 is connected through a 2.2 kilo-ohm resistor R304 to the (−) input of an amplifier 300 which may be of the type designated LM741CN. The (+) input of amplifier 300 is connected through a 2 kilo-ohm resistor R306 to the movable arm of a 10 kilo-ohm potentiometer R308. Potentiometer R308 is connected through a 4.7 kilo-ohm resistor R310 to a +12-volt source, and through a 4.7 kilo-ohm resistor R312 to a negative 12-volt source. Potentiometer R308 provides an off-set control for the joystick 22.

The output of amplifier 300 is connected back to the (−) input through a 12 kilo-ohm resistor R314, which is shunted by a 0.001 microfarad capacitor C300. The output is also connected to terminal 15 of a switch connector designated J43-A.

The movable arm of potentiometer R302 is connected through a 10 kilo-Ohm resistor R316 to the (+) input of a voltage comparator 302. Resistor R316 is connected to a grounded 0.1 microfarad capacitor C302. The resistor R316 is also connected to the (−) input of a voltage comparator 304. The comparators 302 and 304 may be of the type designated 311N. The output of comparator 302 is connected to terminal 6 of switch connector J43-A, and the output of comparator 304 is connected to terminal 7 of the switch connector. The output of comparator 302 is also connected to a positive 5-volt source through a 4.7 kilo-ohm resistor R318, and the output of the comparator 304 is connected to the 5-volt source through a 4.7 kilo-ohm resistor R320.

The output of comparator 302 is connected through a 3 megohm resistor R322 and through a 4.7 kilo-ohm resistor R324 to the movable arm of a 50 kilo-ohm potentiometer R326. The potentiometer R326 is connected through a 20 kilo-ohm resistor R328 to a positive 15-volt source, and through a 20 kilo-ohm resistor R330 to a negative 15-volt source. A second 50 kilo-ohm potentiometer R332 is connected in parallel with the potentiometer R326. Potentiometer R326 forms a joystick adjustment for the record VTR, and the potentiometer R332 forms a joystick adjustment for the source VTR.

The movable arm of potentiometer R332 is connected through a 4.7 kilo-ohm resistor R334 and through a 3 megohm resistor R336 to the output of comparator 304. The (+) input of amplifier 302 is connected to the junction of resistors R322 and R324, and the (+) input of comparator 304 is connected to the junction of resistors R334 and R336. The movable arms of potentiometer R326 is connected to a grounded 0.1 microfarad capacitor C306, and the movable arm of potentiometer R332 is connected to a grounded 0.1 microfarad capacitor C308.

As the joystick 22 of FIG. 1 is moved to the right or to the left, the wiper of potentiometer R300 moves in one direction or the other, causing the amplifier 300 to produce an analog output which is positive as the joystick is moved towards the upper end of potentiometer R300, and which is negative as the joystick is moved towards the lower end. The wiper position for zero analog output may be adjusted by the potentiometer R308.

When the joystick 22 of FIG. 1 is moved up or down, the wiper of potentiometer R302 moves towards the upper end of the potentiometer, or towards the lower end. When the wiper of potentiometer R302 is moved towards the upper end, comparator 302 produces an output which is introduced to terminal 6 of switch connector J43-A to select the record VTR for control by the joystick. On the other hand, when the wiper of potentiometer R302 is moved toward the lower end, the comparator 304 becomes conductive, and a positive output is introduced to terminal 7 of the switch conductor which selects the source VTR to be controlled by the joystick.

The potentiometer R326 adjusts the voltage threshold at which the record VTR is selected, and the potentiometer R332 controls the voltage threshold at which the source VTR is selected.

When the cruise switch 33A on top of the joystick 22, as shown in FIG. 1, is operated, a ground is applied to terminal 4 of switch connector J43-A. This activates a sample and hold circuit, which causes the record or source VTR joystick control to be placed in a "cruise mode". During the "cruise mode" the voltage previously introduced by the amplifier 300 to terminal 15 of J43-A is maintained, so as to establish a constant speed to the controlled VTR so long as the cruise mode continues.

As shown in FIG. 7B, the pushbutton switches 13A, 13B and 13C of the joystick control panel 12 are connected to terminals 16, 3 and 2 respectively of switch connector J43-A. A lamp connector J42-A is connected, as shown, to the illuminating lamps in the pushbuttons 13A, 13B and 13C, and also to the LED indicators 13F, 13G, 13H, 13E and 13D. 200 ohm resistors R340, R342, R344, R346 and R348 are included in the connections to the respective LED's.

Figure 8B:
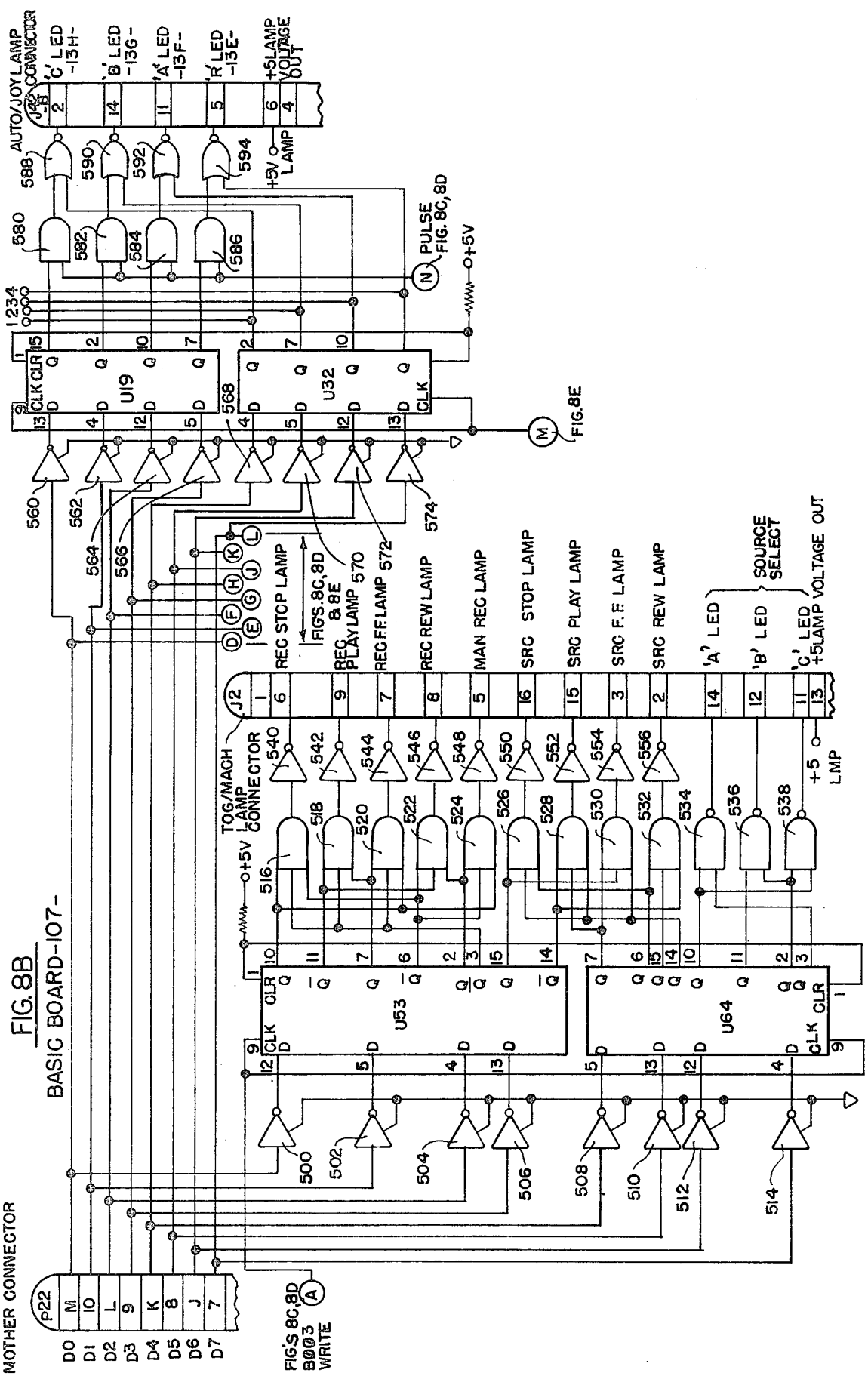

The circuit boards of the system, including the basic board 107 of FIG. 4, are interconnected through a mother connector board. The communication paths between the various circuit boards include the digital bus of FIG. 4 which, for example, is a 16-line address bus and an 8-line bi-directional data bus. The circuitry for the basic board 107 is shown in FIGS. 8A-8E. In FIG. 8A, the mother connector board P22 is connected to an integrated circuit U51 of the type designated LM325N.

The auto/joy switch connector J43,B is connected as shown. Terminal 15 is connected through a 3.9 kilo-ohm resistor R400 and through a diode CR400 to the (−) input of an amplifier U61. The diode may be of the type designated 1N4148. The terminal 15 is also connected through a 10 kilo-ohm resistor R402 to the (−) input of voltage comparator U48B. The comparator U48B may be of the type designated 311N.

Resistor R400 is connected to a grounded 330 ohm resistor R404. The diode CR400 is shunted by a 10 kilo-ohm resistor R406, and by a second diode CR402 which, likewise, may be of the type designated 1N4148. The output of amplifier U61 is connected back to the (−) input through a 6.8 kilo-ohm resistor R410. The (+) input of the amplifier is grounded.

Resistor R402 is connected to a grounded 0.1 microfarad capacitor C400 and to the (−) input of a second voltage comparator U48A which also may be of the type designated 311N. The output of comparator U48A is connected bacl to the (+) input through a 3 megohm resistor R412. Resistor R412 is connected through a 4.7 kilo-ohm resistor R414 to the movable arm of a 50 kilo-ohm potentiometer R416. Potentiometer R416 is connected through a 20 kilo-ohm resistor R418 to a positive 15-volt source, and through a 20 kilo-ohm resistor R420 to a negative 15-volt source.

A second 50 kilo-ohm potentiometer R422 is connected across potentiometer R416. The movable arm of potentiometer R422 is connected through a 4.7 kilo-ohm resistor R424 to the (+) input of comparator U48B, and through a 3 megohm resistor R426 to the output. The movable arms of potentiometer R416 and R422 are respectively connected to grounded 0.1 microfarad capacitors C404 and C406. Potentiometer R416 forms a threshold control for the reverse direction of the joystick 22, and potentiometer R422 forms a threshold control for the forward direction for joystick 22.

The output of comparator U48A is connected through an inverter I400 to the input of a "nand" gate 400. The output terminal is also connected through a 4.7 kilo-ohm resistor R430 to a positive 5-volt source. The output of comparator U48B is connected to another input of "nand" gate 400, and through a 4.7 kilo-ohm resistor R432 to a positive 5-volt source. The output of comparator U48B is connected through an inverter I402 to one input of a "nand" gate 402. The output of comparator U48A is connected to a "nand" gate 404 to a "nand" gate 406. The output of "nand" gate 404 is connected to one input of a "nand" gate 408, and the output of "nand" gate 402 is connected to the other input. The output of "nand" gate 408 is connected through a 10 microfarad capacitor C406 and through an inverter I406 and a further inverter I408 to the input of a "nand" gate 408. A further input of "nand" gate 404, and capacitor C406 are connected through a 10 kilo-ohm potentiometer R436 to a positive 5-volt source. Potentiometer R436 provides a center delay control.

Inverter I406 is also connected through a 20 kilo-ohm resistor R438 to the base of a transistor Q410. The emitter of transistor Q410 is grounded, and the collector is connected through a 1 kilo-ohm resistor R440 to a positive 5-volt source, and also to terminal 22 of mother connector P22.

The inverter I402 is also connected to the "nand" gate 408. The output of "nand" gate 408 is connected to a "nand" gate 410, and the output of "nand" gate 406 is connected to a "nand" gate 412. The "nand" gates are cross-connected as a latch, the output of which is connected to terminal C.

The inverter I406 is connected through a 20 kilo-ohm resistor R444 to the base of a transistor Q402. The emitter of transistor Q402 is grounded, and its collector is connected to pin 13 of an integrated circuit designated U34. The "nand" gate 400 is connected through an inverter I416 to terminal B. Amplifier U61 is connected through a 4.7 kilo-ohm resistor R446 to pins 14, 11, 6 and 3 of integrated circuit U34. The pins 2, 10, 7 and 15 of integrated circuit U34 are connected respectively to terminals H, 5, F and 6 of mother connector P22. The inverters may be of the type designated 74C14, the "nand" gates may be of the type designated 4011, the transistors may be of the type designated 2N3565.

Terminals 1, 2, 3 and 4 are connected through respective inverters I410, I412, I414 and I416 to pins 1, 9, 8, 16 respectively of integrated circuit U34. The inverters may be of the type designated 74C14. The integrated circuit U34 may be of the type designated LF1332.

In FIG. 8B the terminals M, 10, L, 9, K, 8, J and 7 of the mother connector P22 are connected respectively to buffers 500, 502, 504, 506, 508, 510, 512 and 514 which may be of the type designated 74LS240. The buffers are connected to a pair of integrated circuits designated U53 and U64, each of which may be of the type designated 74LS175. The integrated circuits are connected, as shown, to a series if "and" gates 516, 518, 520, 522, 524, 526, 528, 530, 532 which may be of the type designated 74LS11, and to a series of "nand" gates 534, 536, 538 which may be of the type designated 74LS38. The "and" gates are connected through inverters 540, 542, 544, 546, 548, 550, 552, 554 and 556. The inverters may be of the type designated ULN2003. The inverters and "nand" gates are connected to the designated terminals of a toggle/machine lamp connector J2.

The aforesaid terminals of mother collector P22 are also connected to terminals D, E, F, G, H, J, K. L of the data bus which are connected to the circuits of FIGS. 8C and 8D. These terminals are also connected through buffers 560, 562, 564, 566, 568, 570, 572, 574 to a pair of integrated circuits U19 and U32. The buffers may be of the type designated 74LS240, and the integrated circuits U19 and U32 may be of the type designated 74LS175.

The integrated circuits U19 and U32 are connected, as shown to "and" gates 580, 582, 584 and 586 and to "nor" gates 588, 590, 592 and 594. The "and" gates may be of the type designated 74LS08, and the "nor" gates may be of the type designated 74LS33. The "and" gates are connected to the AUTO/JOY lamp connector J74B.

Figure 8C:
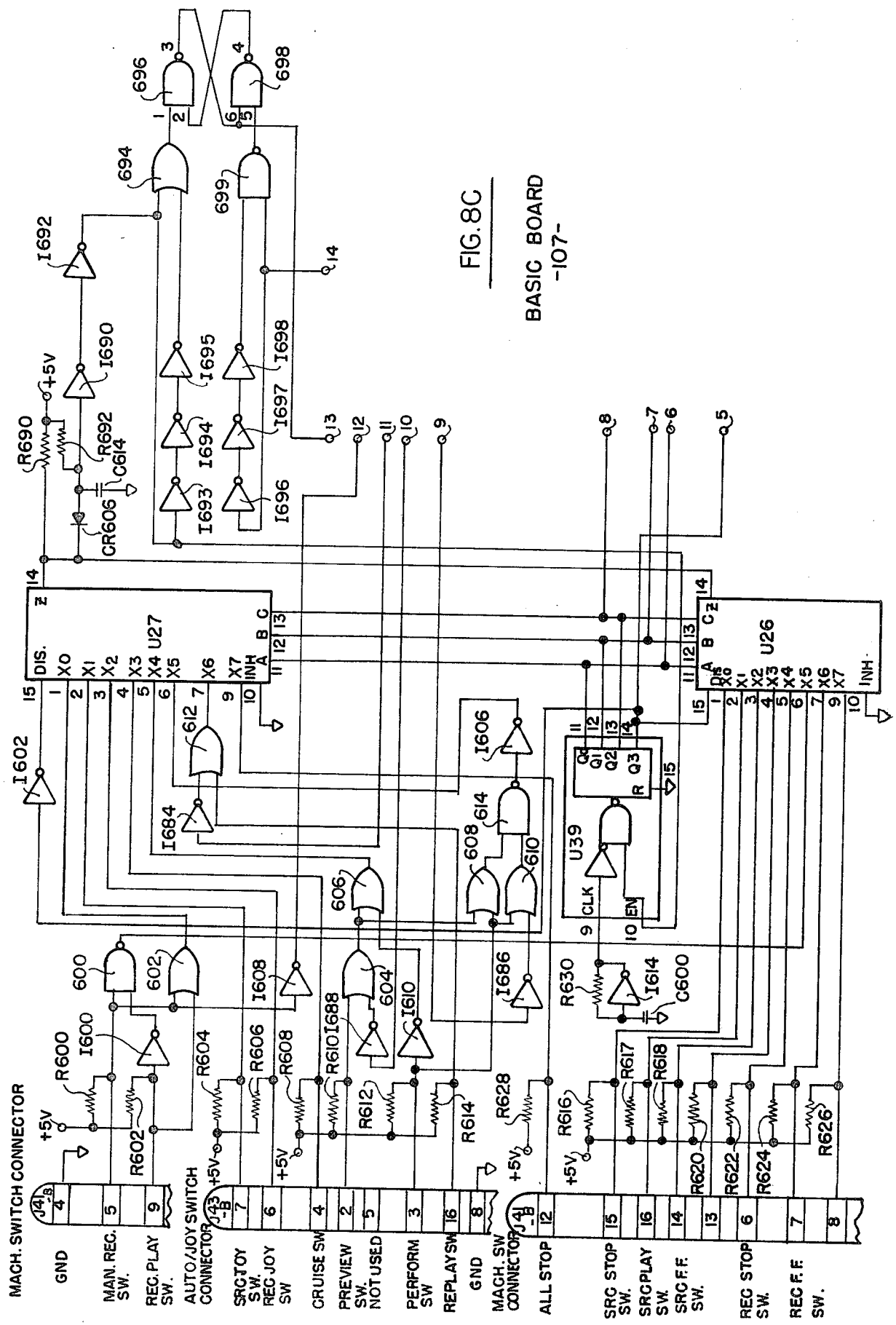

In the circuit of FIG. 8C, the machine switch connector J41B is connected to "nand" gate 600 and to an "or" gate 602. Gate 600 may be of the type designated 4011 and gate 602 may be of the type designated 4071. The terminals 5 and 9 of the connector are also connected through respective 10 kilo-ohm resistors R600 and R602 to a positive 5-volt source. Terminal 9 is connected through an inverter I600 to the gate 600. The inverter may be of the type designated 74C14. "Or" gate 602 is connected to pin 1 of an integrated circuit U27.

The AUTO/JOY switch connector J43 is also connected to the integrated circuit U27. Terminals 7 and 6 of the connector are further connected through 100 kilo-ohm resistor R604 and R606 to a positive 5-volt source; terminals 4 and 2 are connected through 10 kilo-ohm resistor R608 and R610 to the positive terminal; and terminals 3 and 16 are connected through 10 kilo-ohm resistors R612 and R614 to the positive 5-volt source. Terminal 2 is connected to an "or" gate 604 which, in turn, is connected through a further "or" gate 606 to the integrated circuit U27. Terminal 3 is connected to an "or" gate 608 and to a further "or" gate 610. Terminal 16 is connected to an "or" gate 612. "Or" gates 608 and 610 are connected to a "nand" gate 614 which, in turn, is connected to the integrated circuit U27 through an inverter I606. The terminal 5 of connector J41B is connected to an inverter I608, and terminal 3 of connector J43B is connected to an inverter I610. Inverter I608 is connected to terminal 21 of mother connector P22, and inverter I610 is connected to gate 606. The inverters may be of the type designated 74C14.

The machine switch connector J41B is connected to an integrated circuit U26. The integrated circuits U26 and U27 may be of the type designated 14512. The terminals 15, 16, 14, 13, 6, 7 and 8 of the connector J41B are also connected through 10 kilo-ohm resistors R616, R617, R618, R620, R622, R624 and R626 to a positive 5-volt source. Terminal 12 of connector J41B is connected to pin 9 of integrated circuit U27, and to a positive 5-volt source through a 10 kilo-ohm resistor R628.

The circuit also includes an integrated circuit U39 which constitutes one-half of the integrated circuit designated 14518. Pin 9 of integrated circuit U39 is connected to a 27 kilo-ohm resistor R630 which is shunted by an inverter I614. The re-istor and the inverter are also connected to a grounded 0.1 microfarad capacitor C600. The inverter may be of the type designated 74C14.

Pins 11, 12, 13 and 14 of the integrated circuit U39 are connected to pins 11, 12, 13 and 15 of integrated circuit U26, pins 11, 12 and 13 of integrated circuit U26 are connected to pins 11, 12 and 13 of integrated circuit U27. Pin 14 of integrated circuit U39 is also connected to inverter I602.

Pins 11, 12, 13 and 14 of integrated circuit U39 are also connected to a series of buffers 630, 632, 634, 636 which may be of the type designated 74LS240. These pins are also connected through respective 10 kilo-ohm resistors R630, R632, R634 and R636 to a positive 5-volt source. Terminals B and C are connected to a pair of buffers 638 and 640, which together with buffers 642 and 644 are connected to the data bus. The logic buffers 638, 640, 642 and 644 may be of the type designated 74LS240. The inputs of buffers 638, 640, 642 and 644 are connected through respective 10 kilo-ohm resistors R638, R640, R642 and R644 to a positive 5-volt source.

Buffers 630, 632, 634 and 636 are also connected to the data bus.

The buffers 646, 648, 650 and 652 are connected to an integrated circut U17, and buffers 654, 656, 658, and 660 are connected to an integrated circuit U18. The integrated circuit U17 and U18 may be of the type designated 74LS175. Pins 7, 15, 10 and 2 of integrated circuit U18 are connected to respective "and" gates 662, 664, 666 and 668. These gates may be of the type designated 74LS08. The pins 1, 7, 15 and 10 are connected through respective 10 kilo-ohm resistors R646, R648, R650 and R652 to a positive 5-volt source. Pins 15, 2 and 7 of integrated circuit U17 are also connected through respective 10 kilo-ohm resistors R654, R656 and R657 to positive terminals.

Pins 7, 15 and 10 of integrated circuit U18 are connected to respective "or" gates 670, 672 and 674. These "or" gates may be of the type designated 4071. The pins are also connected, together with "and" gates 662, 664 and 666 to respective "or" gates 676, 678 and 680. These gates may be of the type designated 74LS32. These gates, and "and" gate 668 are connected to inverters I650, I652, I654 and I656 to terminals 3, 15 and 1, of AUTO/JOY lamp connector J42B and to terminal 10 of toggle/machine lamp connector J39B. Pin 10 of integrated circuit U17 is connected through an "and" gate 682 and through an inverter I660 to terminal 16 of connector J42B. "And" gate 682 may be of the type designated 74LS08 and inverter I660 may be of the type designated ULN2003. Terminal N to FIG. 8B is connected to the "and" gates 662 and 666. Terminal P is connected to "and" gate 682 and to "and" gates 664 and 668.

The circuit also includes an integrated circuit U39A, which is formed of the other half of integrated circuit 14518. Pin 3 of integrated circuit U39A is connected to an inverter I664 which, in turn, is connected to a further inverter I666. The inverter I664 may be of the type designated 74C14. Inverter I666 is connected to terminal N, whereas inverter I664 is connected through a further inverter I668 to terminal 11 of mother connector P22. The latter inverter is also connected through a 10 kilo-ohm resistor R670 to a positive 5-volt source. The inverters I666 and I668 are of the type designated 74LS14.

An inverter I672 is connected to pin 1 of integrated circuit U39A, and also to a second inverter I674. Inverter I674 is connected to a third inverter I676 which, in turn, is connected to terminal P. Inverter I674 is connected to a "nand" gate 690 which, in turn, is connected through an inverter I680 to pin 7 of integrated circuit U39A. Inverter I676 may be of the type designated 74LS14, and inverter I680 may be of the type designated 74C14. "Nand" gate 690 may be of the type designated 4011. Inverter I672 is shunted by a 5.6 kilo-ohm resistor R672, and the resistor and inverter are connected to a grounded 10 microfarad capacitor C610.

The "or" gates 670, 672 and 674 are connected to respective inverters I684, I686 and I688. These inverters may be of the type designated 74C14. Inverter I684 is connected to "or" gate 612, inverter I686 is connected to "or" gate 610, and inverter I688 is connected to "or" gate 604.

Pin 14 of integrated circuit U27 and pin 14 of integrated circuit U26 are both connected through a 47 kilo-ohm resistor R690 to a positive 5-volt source, and to a diode CR606. The diode may be of the type designated IN4148. The diode is connected to the positive 5-volt source through a 47 kilo-ohm resistor R692 and to a grounded 0.1 microfarad capacitor C614. The diode is also connected to an inverter I690 which, in turn, is connected to an inverter I692. Inverter I692 is connected back to pin 10 of integrated circuit U39 and to an "or" gate 694. The "or" gate 694 is connected to pin 1 of a "nand" gate 696 which is cross-connected with a second "nand" gate 698 to form a latch.

The "or" gate 694 may be of the type designated 4071, and the "nand" gates may be of the type designated 4011. Inverter I692 is also connected through a series of three inverter I693, I694 and I695 to the other input of "or" gate 694. Pin 6 of the latch formed by the "nand" gates 696 and 698 is connected to buffer 644. Terminal R is connected to a "nand" gate 699 whose output is connected to pin 5 of "nand" gate 698. "Nand" gate 699 may be of the type designated 4011. The terminal R is also connected through a series of three inverters I696, I697 and I698 to the other input of "nand" gate 699. The inverter may be of the type designated 74C14.

The mother connector P22 in the circuit of FIG. 8E is connected to "nand" gates 700 and 702. The "nand" gates 700 and 702 may be of the type designated 74LS13, and the "nand" gate 704 may be of the type designated 74LS38. The "nand" gates 700 and 702 are connected through inverters I700 and I702 to "nand" gates 706, 708 and 710. The "nand" gates 708 and 710 may be of the type designated 74LS13. The "nand" gates are connected to terminals R, S and M which, in turn, connect with the circuits of FIGS. 8B and 8C, as indicated. Terminal P from FIG. 8C is connected to the "nand" gate 704. "Nand" gate 704 is connected to terminal 4 of the toggle/machine lamp connector J39B.

The toggle switch connector J40B in FIG. 8E is connected to buffers 714, 716, 718, 720, 722, 724 and 726, which may be of the type designated 74LS244. The buffers 714, 716, 718 and 720 are connected through inverters I706, I708, I710 and I712 to an integrated circuit U62 which may be of the type designated 74LS175. The inverters may be of the type designated 74LS14. The pins 7, 15, 10 and 2 of integrated circuit U62 are connected to terminals W, X, Y, Z of the mother connector P22.

The circuit of FIG. 8E also includes machine switch connector J41B which has terminal 2 connected to buffer 728, and terminal 10 connected to a buffer 742. The circuit also includes toggle switch connector 740B which is connected to the buffers 730, 732, 734, 736, 738, 740 and 744 is indicated. The buffers may be of the type designated 74LS244, and they are connected to terminals D, E, F, G, H, J, K and L. The buffers 714, 716, 718, 720, 722, 724, 726 and 728 are also connected to the terminals.

The mother connector P22 in FIG. 8E is also connected to "nand" gates 750, 752, 754, 756, 758 and 760. These "nand" gates, with the exception of "nand" gates 754 and 756 may be of the type designated 74LS20. The "nand" gates 754 and 756 may be of the type designated 74LS00. "Nand" gate 750 is connected to pin 9 of integrated circuit U62 and, "nand" gate 752 is connected to terminal A. "Nand" gates 760 and 758 are connected to "nand" gates 750 and 752 through inverters I780 and I782. The inverters may be of the type designated 74LS14.

The primary function of the basic board is to convert the inputs from the AUTO/JOY and toggle/machine panels into data acceptable to the microprocessor. The secondary function of the basic board is to convert some of the same inputs to signals that can be processed by the interface logic board and motor drive amplifier board. Another function of the basic circuit board is to receive and store data received from the microprocessor in order to drive the lamps and indicators of the AUTO/JOY and toggle/machine panels.

A key switch encoder circuit is included on the basic board 107, as shown in FIG. 8C. This circuit provides encoding for the pushbutton switches 16A–16M in FIG. 3, as well as for the switching operations performed by the joystick 22, as it selects either the record or source VTR, as explained in conjunction with the circuit of FIG. 7A. The operation of the cruise switch 22A is also encoded by the circuit of FIG. 8C, as are the pushbutton switches 13A, 13B and 13C of FIG. 2.

Connections from all of the foregoing switches are made to the integrated circuits U27 and U26. These integrated circuits are multiplexers, and function as switches selectively to switch the input terminals to the common output terminal of each switch, under the control of the binary signals applied to the input terminals A, B and C. These binary signals are under the control of a counter U39 which counts continuously until any one of the foregoing switches is actuated. When the most significant bit Q3 of the counter is off, the switch &26 is disabled, and the switch U27 is enabled. On the other hand, when the most significant bit Q3 is on, the switch U27 is disabled and the switch U26 is enabled.

The encoder circuit is such that whenever a particular switch is actuated, the counter U39 counts up to a certain count, corresponding to the data code assigned to that switch, and stops. This causes the data code corresponding to the particular switch to be displayed across the terminals 5, 6, 7 and 8. At the same time, the latch 696–698 is actuated so that the strobe bit appears at terminal 14, to indicate to the microprocessor that valid information is available across the terminals 5, 6, 7 and 8.

It will be remembered that whenever one of the pushbutton switches of FIG. 2 is operated, it becomes illuminated. The driver circuitry for illuminating the pushbutton switches is shown in FIG. 8B. In the circuit of FIG. 8B, the integrated circuits U19 and U32 are flip-flop registers which respond to data from the microprocessor on the data bus to be set to the encoded multi-bit binary number corresponding to the actuation of a particular pushbutton switch, as that number is received on the data bus from the microprocessor, and in response to a strobe clock pulse from terminal M. Then, the logic circuitry 580–594 causes the particular LED to be energized, corresponding to the operation initiated by the microprocessor.

Likewise, the data from the microprocessor is introduced to flip-flop registers U53 and U64, again under the control of the strobe clock pulse, so that the appropriate lamps in the various pushbutton controls, and the LED's A, B and C of FIG. 2 may be selectively energized, as the various switches are operated.

Auto/joy signal processor circuitry is also included on the basic board, as shown in FIG. 8A. This circuitry includes an amplifier U61, which is connected to a switching circuit U34. Switching circuit is under the control of signals applied to terminals 1, 2, 3 or 4, to determine which of three source VTR's is to be controlled, or whether the record VRT is to be controlled. It should be noted that these signals are applied from terminals 1, 2, 3 and 4 of the circuit of FIG. 8B, so that the proper LED may be illuminated, to indicated which VTR is being controlled. The amplifier U61 produces an analog signal which increases in the positive or negative direction, to control the speed of the capstan motor of the selected video tape recorder as the joystick 22 of FIG. 1 is operated.

The terminal 15 of connector J43-B is also connected to a pair of voltage comparators U48A and U48B which control the reverse or forward control of the capstan motor of the selected video tape recorder. When the wiper of the joystick potentiometer R300 of FIG. 7A, for example, is moved in a first direction, comparator B produces an output which sets the latch 410, 412 in a first state such that the binary state of the output at terminal C directs the capstan motor to turn in the forward direction. On the other hand, when the wiper of the potentiometer is moved in the opposite direction, the comparator U48A sets the latch in the opposite state, so that the binary state of the outut at terminal C directs the capstan motor to turn in the reverse direction. The reverse control voltage threshold is controlled by potentiometer R416, and the forward control voltage threshold is controlled by potentiometer R422.

When the joystick 22 is in its center position, a signal appears at output terminal B. A "stop region" of a particular controllable width is provided by the circuitry of gates 402, 404 and 408, so that the latch circuit 410, 412 is set to one state as the joystick approaches the center position from one direction, but at a point displaced from the center, and so that the latch is set to the second state when the joystick approaches the center position from the opposite direction, but at a point displaced from the center. This provides a definite region in which the joystick is effectively at "zero" so that the equipment may be brought to a positive stop, before the direction of rotation of the capstan is effectuated. Also, a center delay is provided by the circuit of transistor Q402, which provides a predetermined delay after the joystick has been turned to reverse direction of the capstan motor, before the actual reverse is effectuated, to avoid abrupt action in the video tape recorder which could damage the tape.

Figure 8D:
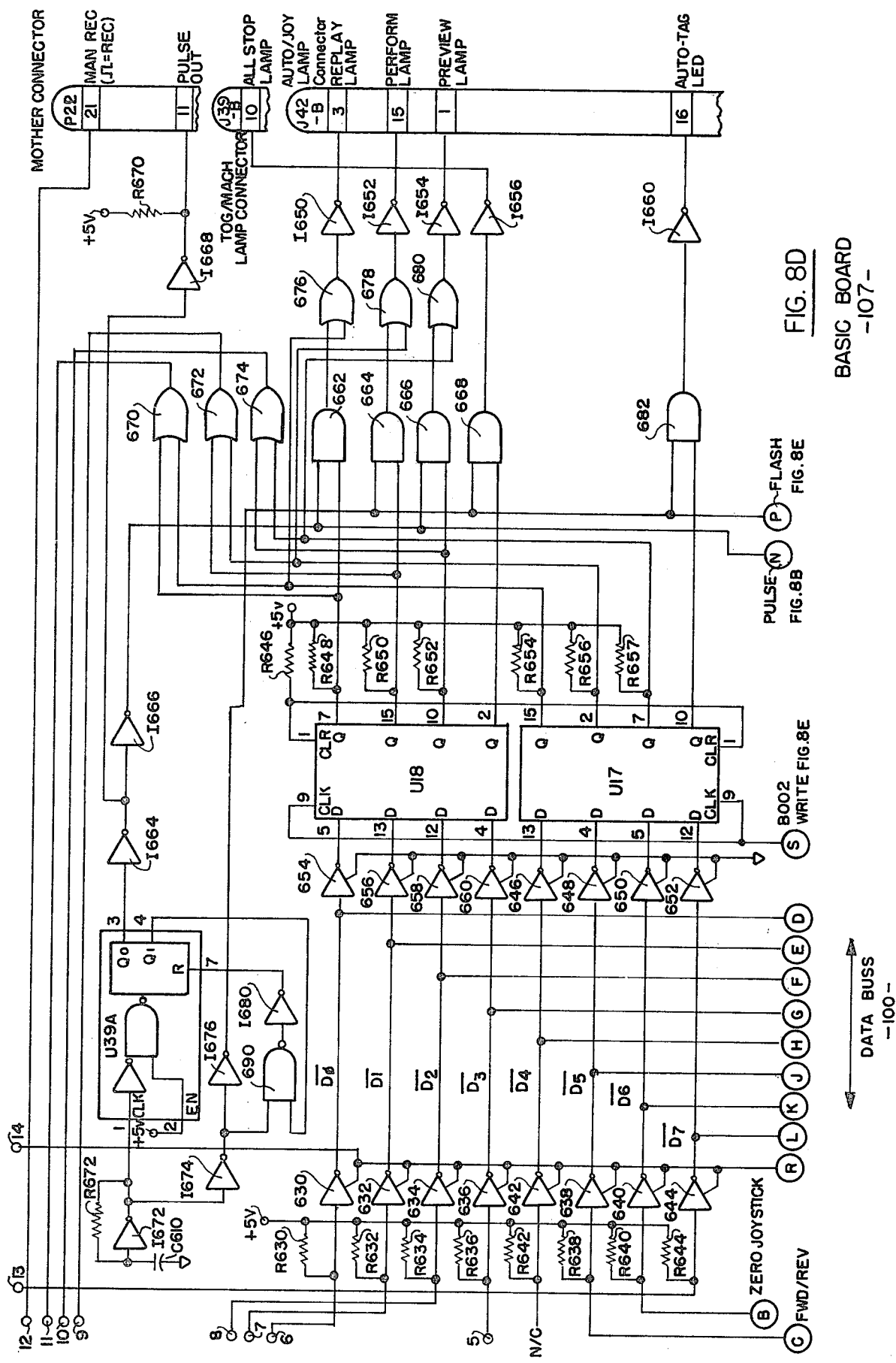

The driver circuitry for the internal lamps in the pushbuttons 13A, 13B and 13C of FIG. 2, and for the auto tag LED 13D, is shown in FIG. 8D. This circuitry includes the flip-flop registers U17 and U18, and operates in the same manner as the driver circuitry of FIG. 8B.

A pulse generator U39A is also included in the circuit of FIG. 8D, and this generator provides a flashing light in the pushbuttons 13A, 13B, 13C, at the appropriate intervals, which indicate that a particular pushbutton should be operated next in a particular sequence.

The interface logic board 124 is shown in circuit detail in FIGS. 9A and 9B. The circuitry of this board serves to interface the outputs from the basic circuit board 107 (FIGS. 8A-8E) and microprocessor board 108 (FIG. 11) to the motor drive amplifier board 116 of FIG. 10 and associated video tape recorder. The board also furnishes status information from the video tape recorder to the microprocessor. Although only one interface logic board is shown, two such boards are normally used in the system, one for the source video tape recorder, and the other for the record video tape recorder.

As illustrated in FIGS. 9A and 9B, the designated terminals on the mother board connector are respectively connected to a series of buffers 900, 902, 904, 906, 908, 910, 912 and 914 on the interface board, which may be of the type designated 74LS240. The buffers are connected to integrated circuits U19, U30, U20 and U31 in FIG. 9B. These integrated circuits may be of the type designated 74LS175. The Q4 and Q3 output terminals of integrated circuit U19 are connected to an integrated circuit U6 which may be of the type designated 14555.

The interface circuit board of FIG. 9A also includes a plurality of buffers designated 916, 918, 920, 922, 924, 926, 928 and 930 connected as shown, these logic elements also being of the type designated 74LS240. The circuit of FIG. 9A also includes an integrated circuit U34 of the type designated 4040, and integrated circuit U1 of the type designated 14053, and an integrated circuit U2 of the type designated 4013. Associated with the integrated circuits are a plurality of "or" gates 932, 934, 936, 938 and 940, of the type designated 4075; and a plurality of "nor" gates 942, 944, 946, 948, 950 and 952 of the type designated 4001.

The circuit of FIG. 9A also includes a plurality of "and" gates 954, 956, 968 and 960 of the type designated 4081. The circuit also includes an "and" gate 962 of the type designated 4082. Also included in the circuit are a pair of inverters I964 and I966 of the type designated 4069, inverters I968, I970, I971 and I975 of the type designated 74C14, and a plurality of inverters I972, I974 and I976 of the type designated ULN2003. The circuit also includes buffers 978 and 980 of the type designated 4050.

Also included in the circuit of FIG. 9A, and connected to an input of "and" gate 954 is a 0.1 microfarad capacitor C900 which is connected to a grounded 100 kilo-ohm resistor R900 and through a 1 kilo-ohm resistor R901 to the positive 5-volt source. Connected to "or" gate 934 are grounded 300 kilo-ohm resistors R902, R904 and R906.

The "or" gate 936 is connected through a 10 kilo-ohm resistor R908 to the base of an NPN transistor Q900 which may be of the type designated 2N3053. The "or" gate is also connected through inverter I968 and through a 10 kilo-ohm resistor R910 to the base of a like transistor designated Q902. The emitter of transistor Q900 is connected to a grounded 1 kilo-ohm resistor R912 and to the base of an NPN transistor Q904 which may be of the type designated PIP41. Likewise, the emitter of transistor Q902 is connected to a grounded 620 ohm resistor R914 and to the base of an NPN transistor Q906 which, likewise, may be of the type designated PIP41. The collector of transistor Q900 is connected to the collector of transistor Q904, and to a grounded diode CR900. Likewise, the collector of transistor Q902 is connected to the collector of transistor Q906 and to a diode CR902. The diodes may be of the type designated IN4004. The emitter of transistor Q904 is grounded.

The circuit of FIG. 9B includes a counter U36 of the type designated 4017, and a flip-flop U2 of the type designated 4013. The circuit of FIG. 9B also includes a plurality of "nand" gates 905, 907, 909 and 911 of the type designated 4011. The circuit also includes a pair of inverter I913 and I915 of the type designated 74C14, and further inverters I917, I921 and I923 of the type designated ULN2003. The circuit includes a pair of "nor" gates 925, 927, of the type designated 4001, and a further "nor" gate 929 of the type designated 4001. The circuit also includes an "and" gate 931 of the type designated 4082, and an "or" gate 933 of the type designated 4075. The circuit also includes inverters I935 and I937 of the type designated 74C14 and inverters I939, I941, I943, I945, I947 and I951, of the type designated ULN2003. The circuit also includes an inverter I953 of the type designated 4069, and buffers 955, 957, 959, 961 and 963 of the type designated 4050.

Inverter I935 is connected to a 1 microfarad capacitor C901 which, in turn, is connected to a grounded 47 kilo-ohm resistor R901. Inverter I937 is connected to a 1 microfarad capacitor C903 which in turn is connected to a grounded 20 kilo-ohm resistor R903. The Q output of the integrated circuit U2 is connected to a 3.3 microfarad capacitor C905 which is connected to a 100 kilo-ohm potentiometer R905 which, in turn, is connected to a grounded 4.7 kilo-ohm resistor R907 to constitute a record delay.

The circuit of FIG. 9B also includes a plurality of "nand" gates 971, 975 and 981 of the type designated 74LS132; and a plurality of "nand" gates 973, 977, 979 and 983 of the type designated 74LS13.

As mentioned above, there are two identical interface logic biards in the basic system of the invention, one for the source video tape recorder and one for the record video tape recorder. Although the circuit boards are identical, there are a number of circuits that are used only when associated with the record video tape recorder. The interface logic board provides interface between the microprocessor board 108 (FIG. 11) and the motor driver amplifier board 116 (FIG. 10) and the associated video tape recorder. Interface to the motor drive amplifier is through the mother connector, and interface to the video tape recorder is through the I/O connector. The circuits on each interface logic board are divided into four functional sections. One section consisting of the gates 973, 975, 977, 981, 979 and 983 in the lower left corner of FIG. 9B and the buffers 900-930 at the left of FIG. 9A, decodes the addresses of the interface logic board and connect the board to the data bus. Another section, consisting of quad flip-flops U19, U20, U30 and U31, decodes U6A and U6B and counter U36 (FIG. 9B), and associated circuits, process the control signals received from the data bus. The quad flip-flops may be of the type designated 74LS175; and the decoders may be of the type designated 14555. A third section comprised of counter U34, multiplexer U1 (FIG. 9A) and associated circuits, transmits the track status of the video tape recorder to the microprocessor. When power is turned on, a pulse is provided that resets counters U34 and U36 and flip-flop U2.

The address of the source interface logic board is B00A (Table of FIG. 5A) for both the read and write cycles. The record interface logic board is addressed at B006 on a read cycle and by B006 and B007 during separate write cycles. B00A is a group of 2 address and B006 and B007 are group 1 addresses. The group 1 and group 2 address lines are connected to the same terminals of the source and record interface logic mother board connectors. BooA WRITE on the source interface logic board and B006 WRITE on the record interface logic board are decoded at the output of "nand" gate 977 (FIG. 9B). They provide clock signals to transfer the status of the data bus to the outputs of U19 and U30. B00A READ on the source interface logic board and B006 READ On the record interface logic biard are decoded at the output of "nand" gate 971. They enable the buffers 916-930 (FIG. 9A) which place the status of the video tape recorder on the data bus. B007 WRITE is decoded at the output of "nand" gate 979 (FIG. 9B) to provide a clock to transfer the states of the data bus to the outputs of U20 and U31. U20 and U31 are not active on a source interface logic board.

The data bits at the Q3 and Q4 outputs of U19 are decoded in both sections of U6 to provide the STOP, PLAY, F/FWD and RWD signals for the associated video tape recorder. It should be noted that the status of the video tape recorder transport control lines is decoded by the "nand" gates 905, 907, 909, 911 and inverters 913 and 915 (FIG. 9B). If one of the transport controls on the video tape recorder is depressed to change its mode of operation, the combined states of the video tape recorder transport control lines will change, changing the two-bit code at the outputs of inverters 913 and 915 which are connected to the data bus.

Any locally induced change in the status of the video tape recorder transport control lines sets the latch comprised of gates 942 and 944 (FIG. 9A). This sets a flag bit on the data bus that indicates that a machine control has been activated at the video tape recorder. During the next microprocessor polling sequence, the two-bit video tape recorder status code will be processed and loaded back into U30 (FIG. 9B). B00A READ (source) delayed by C900 and R900, will then reset the latch.

When an EDIT command is loaded into U20 (Q2) (FIG. 9B), it clocks flip-flop U2 (Q) low which enables counter U36. The counter is clocked by control track pulses from the video tape recorder. The outputs of counter U36 provide a delay between the receipt of the edit command and the time that the $\overline{\text{EDIT}}$ line to the video tape recorder is pulled low. This delay is adjustable over a range of three frames by the AUDIO and VIDEO jumpers. When counter U36 reaches the count determined by the AUDIO or VIDEO connection, it sets flip-flop U2 (Q) through multiplexer U1 (FIG. 9A). Whether the AUDIO OR VIDEO connection is made will be determined by the state of pin 9 of U1). The positive going edge of the Q output of U2, EDIT, will be further delayed by an amount determined by the adjustment of R905. Note that U36 will be reset by the output of inverter 937 when power is turned on.

Control track pulses, CTL, from the video tape recorder may be 30 Hz or 60 Hz depending on the type of video tape recorder connected to the system. If the frequency is 30 Hz, multiplexer U1 (FIG. 9A) will be connected so that the signal passes directly through. If the frequency is 60 Hz, the connections to U1 will be made such that the 60 Hz input will be routed to flip-flop U2-5 where they will be divided to 30 Hz before passing through U1.

During the time the video tape recorder is in the play or joystick mode, the state of the Q1 or Q2 outputs of counter U34 (FIG. 9A) will be read by the microprocessor at each interrogation of the interface logic board which occurs every 15 milliseconds. Thus, it will up-date the status display generator board by the binary equivalent of frames formed by Q1 and Q2 with each interrogation. When B006 or B00A READ terminate, counter U34 will be reset every 15 milliseconds through gates 962 and 940.

If the video tape recorder is in FWD or REW, counter U34 will be reset at a count of 25 to 30 (determined by jumpers ABC/XYZ) through "and" gate 962 and "or" gate 940. The count of 25 to 30 set the latch formed by gates 950 and 952 which causes a flag to be read on data bit D7. Thus it will up-date the status display generator by 1 second if the flag is set.

$\overline{\text{STANDBY}}$ from the video tape recorder is inverted by inverter 966 to provide this bit of informaton to the data bus. It also prevents $\overline{\text{ASSEMBLE}}$ and $\overline{\text{INSERT}}$ going low if standby is low. $\overline{\text{ASS/INS}}$ at the mother connector, when low, will force $\overline{\text{ASSEMBLE}}$ and $\overline{\text{INSERT}}$ high when the output of gate 956 is high, which is during video E to E, when MAN REC is high and for approximately 50 milliseconds at the beginning of EDIT, when $\overline{\text{STANDBY}}$ is high. When high, it forces ASSEMBLE high and INSERT low when the output of gate 956 is high.

The FWD IDLER INTERRUPT and REV SOLENOID amplifiers Q900, Q902, Q904 and Q906, receive their input signals directly from the quad flip-flop data storage. FWD IDLER INTERRUPT disengates the forward idler of the video tape recorder when the video tape recorder is under joystick control and is in reverse. REV SOLENOID engages the reverse solenoid in the video tape recorder which shifts the reel drive mechanism to allow reverse direction tape motion.

Though only one circuit is shown in FIG. 10, there are two motor drive amplifier (MDA) circuit boards in the basic system. These circuits have, as their principal function, the amplification of input signals to drive the capstan motors in the video tape recorders to which their outputs are applied. When JOYSTICK is selected, the joystick analog voltage is amplified. When CRUISE is selected, the capstan is driven at the speed determined by the position of the joystick when CRUISE was selected due to a sample and hold circuit in the circuit. When CUE is selected, motor speed is determined by the cue speed adjustment.

In the motor drive circuit of FIG. 10, the mother board connector is connected to an integrated circuit U1000 of the type designated LF13332. The integrated circuit is connected through a 200 ohm resistor R1000 and through a 10 kilo-ohm resistor R1003 to the plus input of an amplifier 1000 of the type designated TL081CP. The junction of resistors R1000 and R1003 is connected to a grounded capacitor C1000 of a capacity of microfarads. The integrated circuit U1000 is also connected to a 100 kilo-ohm potentiometer R1001 which is connected between the positive 12-volt source and ground. The potentiometer is used to control cue speed. A "nand" gate U1002 of the type designated 74LS132 is connected between terminal B21 and integrated circuit U1000, and an "or" gate U1004 is connected between the terminal A19 of the mother board connector and the integrated circuit U1000.

The negative input of amplifier 1000 is connected through a 1 kilo-ohm and a 6.8 kilo-ohm resistor R1004 to the minus input of a second amplifier 1002. The minus input of the latter amplifier is connected to the output through a pair of 12 kilo-ohm resistors R1006 and R1008 which are shunted by a 0.001 microfarad capacitor C1002. Amplifier 1002 is of the type designated 748. The junction of the 1 kilo-ohm and 6.8 kilo-ohm resistors which connected to the minus input of the amplifier is also connected back to integrated circuit U1000 and through a 10 kilo-ohm resistor R1010 to the minus input of an amplifier 1004. The plus input of amplifier 1004 is grounded. The amplifier may be of the type designated 741CN. The output of the amplifier is connected back to the input through a 4.7 kilo-ohm resistor R1012, the resistor being shunted by a 0.001 microfarad capacitor C1006.

The output of amplifier 1004 is connected through a 10 kilo-ohm resistor R1014 to the minus input of voltage comparator 1006. The comparator may be of the type designated 3IIN. The resistor is also connected to the plus input of a voltage comparator 1007 which, likewise, may be of the type designated 3IIN. The resistor is also connected to a grounded 0.1 microfarad capacitor C1008, to a grounded 0.1 microfarad capacitor C1010, and to a grounded 10 kilo-ohm resistor R1016.

The plus input of amplifier 1006 is connected to the output through a 3 megohm resistor R1018, and is connected to a 50 kilo-ohm potentiometer R1020 through a 2.7 kilo-ohm reistor R1022. Resistor R1022 is also connected to a grounded 10 kilo-ohm resistor R1024 and to a grounded 0.7 microfarad capacitor C1012.

The output of amplifier 1006 is connected to a grounded 2.7 kilo-ohm resistor R1019, and through a 2 kilo-ohm resistor R1026 to the base of an NPN transistor Q1000. The transistor may be of the type designated TIP110. The emitter of the transistor is connected to a negative 20-volt source, and the collector is connected through a diode CR1000 to the emitter of an NPN transistor Q1002. The diode CR1000 is also connected through a second diode CR1002 to a negative 8.5-volt source. The diodes may be of the type designated IN4004. Diode CR1000 is also connected through a 220 ohm resistor R1030 to the collector of a PNP transistor Q1004 which may be of the type designated TIP30. The diode is also connected to a grounded 0.1 microfarad capcitor C1018. The output of amplifier 1002 is connected through a 100 ohm resistor R1032 to the base of PNP transistor Q1004, and to the base of an NPN transistor Q1006. Transistor Q1006 may be of the type designated TIP29.

The positive input of amplifier 1007 is connected to resistor R1014, and the output is connected to the positive input through a 300 kilo-ohm resistor R1036, and through a 2.2 kilo-ohm resistor R1038 to a positive 5-volt source. The output of the amplifier is also connected through a 1.2 kilo-ohm resistor R1040 to the base of an NPN transistor Q1008. The output of amplifier 1007 is also connected to a gounded capacitor C1017 of 0.1 microfarads. The transistor Q1008 may be of the type designated TIP110. The collector of the transistor is connected to the positive 20-volt source, and the emitter is connected through a diode CR1008 and through a diode CR1010 to a positive 8.5-volt source. The diodes may be of the type designated IN4004.

The negative input of amplifier 1007 is connected through a 4.7 kilo-ohm resistor R1042 to a 50 kilo-ohm potentiometer R1044. Resistor R1042 is connected to a grounded 10 kilo-ohm resistor R1046 and to a grounded 10 microfarad capacitor C1018. Potentiometer R1020 is connected to potentiometer R1044, and through a 20 kilo-ohm resistor R1048 to a negative 12-volt source. Potentiometer R1020 is also connected to the other side of potentiometer R1044 and through a 20 kilo-ohm resistor R1050 to the positive 12-volt source. Potentiometer R1020 controls −V.SEL. and the potentiometer R1044 controls +V.SEL.

The diodes CR1008 and CR1010 are also connected to the collector of NPN transistor Q1006, and to the collector of an NPN transistor Q1012. Transistor Q1012 may be of the type designated 2N3055. The collectors are also connected to a gounded 0.1 microfarad capacitor C1020. The emitter of transistor Q1006 is connected through a 100 ohm resistor R1054 to the base of transistor Q1012. The base is also connected to the emitter through a 220 ohm resistor R1056, and the emitter is connected through a 0.68 ohm resistor R1058, and through a 12 kilo-ohm resistor R1060 to the junction of resistors R1006 and R1008.

The emitter of transistor Q1004 is connected to the collector of transistor Q1002 through a 220 ohm resistor R1062. Resistor R1062 is connected through a 0.68 ohm resistor R1064 to resistor R1058, and to a grounded 0.1 microfarad capacitor C1028.

Resistor R1058 is also connected to a relay K1000. The energizing coil of relay K1000 is connected to the collector of an NPN transistor Q1022 which may be of the type designated 2N3053. The emitter of transistor Q1022 is grounded, and the base is connected back to terminal B19 of the mother board connector through a 10 kilo-ohm resistor R1062. The energizing coil is shunted by a 0.1 microfarad capacitor C1032, and connects with the positive 20-volt source. The capacitor is shunted by a diode CR1028 which may be of the type designated 1N4004. The relay is also connected, as shown, to terminals B25 and B24 of the mother board connector P9.

Terminal B23 of mother board connector P9 is also connected to a "nand" gate U1003 which may be of the type designated 74LS132. Terminals A9 and B9 of the mother board connector are also connected to an input of "nand" gate U1003, and through a 10 kilo-ohm resistor R1072 to the positive 5-volt source. "Nand" gate U1003 is connected to a second "nand" gate 1004, which also may be of the type designated 74LS132, and the other input of "nand" gate U1004 is connected to the positive 5-volt source through a 10 kilo-ohm resistor R1074, and to a second input of "nand" gate U1002.

"Nand" gate U1004 is connected through a 4.7 kilo-ohm resistor R1076. Resistor R1076 is shunted by a 0.001 microfarad capacitor C1050. Resistor R1076 is also connected to the base of an NPN transistor Q1040 which may be of the type designated 2N2053. The emitter of transistor Q1040 is gounded, and the collector is connected through a 470 ohm resistor R1078 to the positive 12-volt source. The collector is also connected to the base of transistor Q1042, and to the base of transistor Q1044. Transistor Q1042 may be of the type designated TIP29, and transistor Q1044 may be of the type designated TIP30. The emitters of the transistors are connected together, and to relay K1000. The collector of transistor Q1042 is connected to terminal B27 of mother board connector P9, and the collector of transistor Q1044 is connected to terminal B26 and to relay K1000.

As explained above, the motor drive amplifier (MDA) 116 of FIG. 10 controls the capstan motor of the video tape recorder to which it is connected. The signals to which the motor drive amplifier 116 responds originate in the basic circuit board and interface logic board. The circuit of FIG. 10 may be considered to be divided into several sections. It includes a three-mode switch section which consists of gates U1002 and U1004, and quad switch U1000. The three modes are Joystick, Cruise and Cue. Quad switch U1000 selects which mode will provide input to the motor drive amplifier. The sample and hold circuit of amplifier 1002 determines the speed of the motor in the cruise mode. The circuit also includes a voltage range switch section consisting of amplifiers 1004, 1006, 1007, Q1000 and Q1008, selects 20 volts or 8.5 volts for the collectors of the motor drive amplifiers Q1006, Q1012, Q1004 and Q1002.

The joystick (JOY) level input passes through two sections of quad switch U1000 to the input of voltage follower 1000. CUE opens this path and connects "CUE SPEED" potentiometer R1001 to the input of follower 1000. CRUISE will also open the JOY signal path, but potentiometer R1001 will be disconnected from the input of follower 1000. The position of the joystick at the time the CRUISE button was depressed will determine the charge on C1000 which will then provide the cruise input level to follower 1000. Capacitor C1000 is an extremely low-leakage capacitor and will hold its charge for long periods.

$\phi$MDA is a momentary signal generated whenever the joystick is moved through its center position. By closing section 4 of switch U1000, it shorts the input to amplifiers 1000 and 1002 to ground. This prevents a sudden reversal of the joystick from applying a reverse voltage to the capstan motor of the controlled video tape recorder before it has had sufficient time to come to a stop. CUE and CRUISE also control section 4 of switch U1000. When either CUE or CRUISE is high, it holds section 4 of the switch open even if a movement of the joystick causes $\phi$MDA to go low, thus assuring that the output follower 1000 is applied to the input of amplifiers 1002 and 1004.

N FWD will energize relay K1000 to connect the capstan motor of the controlled video tape recorder to the output of the driver amplifier. The input to amplifier 1002 produces a driver amplifier output of the opposite polarity with a level proportional to the input. Potentiometer R1020 provides a damping adjustment to minimize "overshoot" of the capstan motor when the joystick is suddenly released or reversed. The input to amplifier 1002 is also applied to amplifier 1004 where it is amplified and inverted. The inverted output drives level shifters 1006 and 1007 which drive transistors Q1000 and Q1008. When the input to amplifier 1002 is positive, Q1000 will be turned on and Q1008 will be turned off. This connects $-20$ V to the collectors of Q1004 and Q1002, and 8.5 V to the collectors of Q1006 and Q1012. The dissipation in Q1006 and Q1012 is, therefore, substantially reduced. The opposition condition occurs when the input to amplifier 1002 is negative.

When K1000 is de-energized, the capstan motor of the controlled video tape recorder is connected to the output of K1000 a switching circuit consisting of transistors Q1040, 1042 and 1044. This switching circuit operates only during a PREVIEW, normal PLAY or EDIT sequence and allows a capstan voltage interrupt when U1003 receives a BUMP command. BUMP provides an interrupt signal (modulated by 50 Hz or 60 Hz) if required, to slow the motor momentarily and allow the tape in the other video tape recorder to "catch up" so that the two video tape recorders will be synchronized at the edit point.

Figure 11:
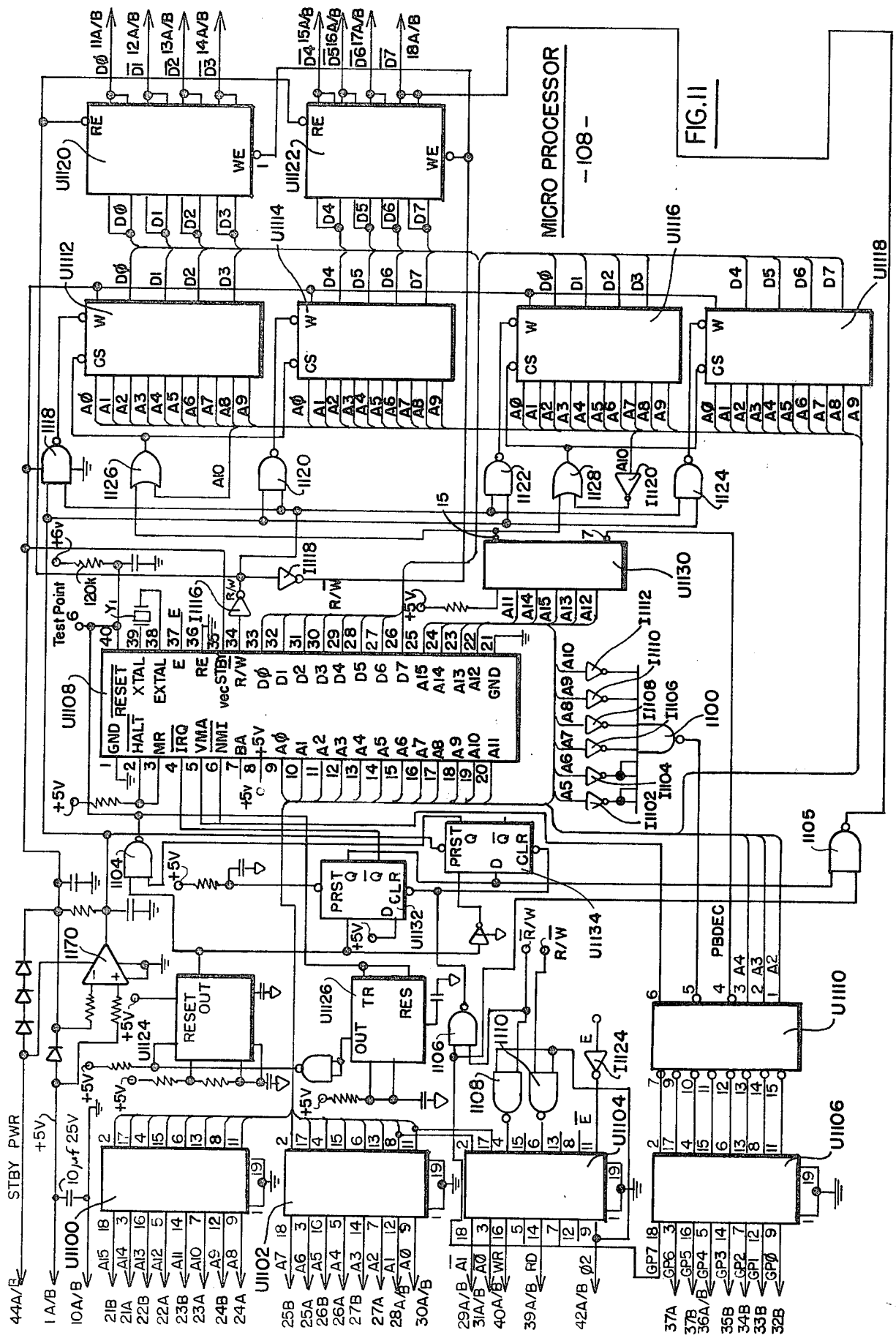

The microprocessor circuit is shown in FIG. 11. The microprocessor includes non-inverting address output buffers U1100 and U1102, which may be of the type 74LS244 and group decode and control output buffers U1104 and U1106 which may be of the type designated 74LS240. The circuit also includes a microprocessor U1108 which may be of the type designated 6802, and a decoding integrated circuit U1110 which may be of the type designated 74LS138. The microprocessor circuit of FIG. 11 also includes a plurality of random access memories (RAMS) U1112, U1114, U1116 and U1118 which may be of the type designated 4045. Also included in the circuit are inverting input/output data bus buffers U1120 and U1122 which may be of the type designated 74LS240. Finally, the circuit includes timers U1124 and U1126, each of which may be one-half of a dual timer of the type designated 556.

The microprocessor circuit of FIG. 11 includes a number of inverters I1102, I1104, I1106, I1108, I1110, I1112, I1116, I1118, I1120, I1122 and I1124, which may be of the type designated 74LS04. The inverters I1102, I1104, I1106, I1108, I1110 and I1112 are all connected to a "nand" gate 1100 which may be of the type designated 74LS30. The microprocessor circuit also includes additional "nand" gates 1104, 1106, 1108 and 1110 which may be of the type designated 74LS00. Also included are a pair of flip-flops U1132 and U1134. The flip-flops may be of the type designated 74LS77. Also included in the microprocessor circuit are a plurality of "nand" gates 1118, 1120, 1122 and 1124 which may be of the type designated 4093; the circuit also includes "or" gates 1126 and 1128 of the type designated 74LS32. The microprocessor circuit further includes a voltage comparator 1170 which may be of the type designated LM311. Finally, the microprocessor circuit includes a decoding integrated circuit U1130 which may be of the type designated 74LS138.

The read only memory (ROM) which stores the program for the microprocessor is shown in FIG. 12. The memory includes three buffer integrated circuits U1200, U1202 and U1204. Integrated circuit U1204 may be of the type designated 74LS240, and integrated circuits U1200 and U1202 may be of the type designated 74LS244. The read only memory also includes eight integrated circuits U1206, U1208, U1210, U1212, U1214, U1216, U1218 and U1220 of the type designated 2716. Also included is a decoding integrated circuit U1222 of the type designated 74LS138. A "nand" gate 1200 of the type designated 74LS13 is connected to integrated circuit U1204, as shown.

The microprocessor U1108 in FIG. 11 has 16 address line outputs and 8 input/output data lines. The address outputs are connected to the address bus of the mother board through the non-inverting buffers U1100 and U1102, and the data outputs are connected to the 8-bit, bidirectional data bus of the mother board through inverting buffers U1120 and U1122. Therefore, on the mother board, address bus signals are positive true, and bidirectional data bus signals are ground true. Input to the microprocessor will consist of data from outside devices, RAM and instructions from PROM's of the memory board circuit 110 of FIG. 12. When the microprocessor U1108 has completed the operation required by the last instruction, data output will be addressed to the RAM's U1112, U1114, U1116, U1118 and/or to one of the other circuit boards. The clock oscillator for the microprocessor U1108 is internal and controlled by the 3.579 MHz crystal, Y1. The 3.579 MHz crystal frequency is divided by four in the microprocessor to provide the 895 KHz system clock frequency.

The microprocessor U1108 has a read/write output by which it directs the RAM's U1112, U1114, U1116, U1118 or other circuit boards to accept (write) data or to output (read) data. It is to be noted that write and read are relative to the microprocessor. The microprocessor "reads" data from memory or from one of the circuit boards, and it "writes" data into memory or to a circuit board. Its VMA output indicates that data on the address lines is valid. This output is used by a decode section of the microprocessor circuit, and by the RAM enable circuits to insure that a response is not generated by an invalid address that might exist prior to all address lines becoming stable. The IRQ input to the microprocessor (Interrupt Request) allows interruption of the microprocessor when it is performing a function that has lower priority than that which is requesting the interrupt. The IRQ input is set low every 15 milliseconds by the real time control circuit.

The microprocessor circuit includes a real time control circuit which consists of timers U1126, U1124 and flip-flops U1132, U1134. Timer U1124 clocks flip-flops U1132 and U1134 once every 15 milliseconds with a 10 microsecond pulse. This provides an interrupt request ($\overline{IRQ}$) input to microprocessor U1108. The microprocessor must then complete the current operation and then poll all the system inputs and respond to those inputs requiring service. When the microprocessor responds to the interrupt ($\overline{IRQ}$), it will, within the 15 millisecond period, output a write command which will reset flip-flops U1132 and U1134, through "nand" gate 1106, removing the interrupt input to the microprocessor. If the microprocessor, for some reason, does not issue the write command during that period, the flip-flop U1134 will be clocked true, forcing its Q output high and creating a RESET signal to the microprocessor through "nand" gate 1104. The RESET signal will also trigger timer U1126 which will disable timer U1124 for one second to allow the microprocessor to com-lete its initializing routine free of interrupts. When the timer U1126 times out, the system will resume its 15 millisecond interrupt cycles.

The decode section of the microprocessor circuit consists of the decoders U1110 and U1130, hex inverters I1102-I1112, and "nand" gate 1100. Together, the components of this section decode the states of address lines A2 through A15 to generate group codes GP$\phi$ through TP6. The generation of these codes on the microprocessor board minimizes the number of integrated circuits required on the other circuit boards for decoding the ddress. Note that the VMA (Valid Memory Address) output of the microprocessor U1108 must be high before a group address output can be developed.

The address and group output buffers U1100, U1102, U1104, U1106 are always enabled. It is to be noted that there are two sets of buffers U1120 and U1122 on the data lines. One set will be enabled when the microprocessor is outputting a write signal which will enable data to pass from the microprocessor board. The other set will be enabled when the microprocessor outputs a read signal allowing data to be entered to the microprocessor board. The read/write (R/$\overline{W}$) signal from the microprocessor, and its complement, are gated through gates 1108 and 1110 with the microprocessor clock output $\phi 2$, from pin 9 if the microprocessor. This provides read/write outputs with edges synchronized to the clock.

The RAM chips U1112 and U1114 are enabled by "or" gate 1126 when the Y0 output of U1130, pin 15, is low and address line A10 is low. The RAM chips U1116 and U1118 are enabled by "or" gate 1128 when pin 15 of U1130 is low and A10 is high. When enabled and addressed, data will be written into the RAM's, when VMA, R/$\overline{W}$ and E are all high. The "nand" gate 1118 provides the write signal to RAM U1112; "nand" gate 1120 provides the write signal to RAM U1114; and "nand" gates 1122 and 1124 provide the write signals to RAM's U1116 and U1118.

The schematic diagram for the memory board 110 is shown in FIG. 12. The circuits on this board consist of eight programmable read only memories (PROMS) U1206-U1220, with total memory capacity of 16 K 8-bit bytes; a decode section that provides enabling of the individual PROMS, and a buffer section. Address input lines A11 through A15 provide the input to decoder U1122. The states of these input lines will provide an enabling input to only one of the PROMS at any one time. The states of address lines A0 through A10 will, then, produce an output from the enabled PROM corresponding to the data stored at that address.

The address buffers U1200 and U1202 are always enabled. The data buffer U1204 is enabled by "nand" gate 1200 only when address line A14 and read line RD are both high.

The invention provides, therefore, a microprocessor-controlled video tape editing system which is modular expanable for on-line or off-line editing of a cassette or open reel helical scan-type video tape recorders, or the like.

It will be appreciated that although a particular embodiment of the invention has been shown and described, modifications may be made. It is intended in the following claims to cover the modifications which come within the spirit and scope of the invention.

What is claimed is:

1. An editing control system for transferring selected video information from a video source to a record video tape recorder, said editing control system including: a plurality of solid state electronic circuit boards for controlling the transfer of video information from the source to the record video tape recorder; a microprocessor circuit board connected to said first-named circuit boards for cyclically and successively transmitting signals to and receiving signals from different ones of said circuit boards; a first control panel including a plurality of manually-operated control switches connected to respective ones of said circuit boards to activate control circuits thereon and to establish operating modes therein; a second control panel including a plurality of manually-operated remote controll switches adapted to be connected to said record video tape recorder to control the operation of said record video tape recorder; a third control panel including a plurality of manually-operated control switches connected to one of said circuit boards to establish selected operating modes in the editing control system, said third control panel further including manually-controllable potentiometer means connected to one of said circuit boards for effectuating forward and reverse motion of the record video tape recorder under manual control from a still-frame position and at a speed determined by the setting of the potentiometer means on either side of a neutral position, and a manually-operated cruise switch connected to one of said circuit boards to cause the record video tape recorder to be driven at a speed selected by said potentiometer means independent of subsequent settings of said potentiometer means.

2. An editing control system for transferring selected video information from a source video tape recorder to a record video tape recorder, said editing control system including: a plurality of solid state electronic circuit boards for controlling the transfer of video information from the source video tape recorder to the record video tape recorder; a microprocessor circuit board connected to said first-named circuit boards for cyclically and successively transmitting signals to and receiving signals from different ones of said circuit boards; a first control panel including a plurality of manually-operated control switches connected to respective ones of said circuit boards to activate control circuits thereon and to establish operating modes therein; a second control panel including a plurality of manually-operated remote control switches adapted to be connected to said record video tape recorder to control the operation of said record video tape recorder; a third control panel including a plurality of manually-operated control switches connected to one of said circuit boards to establish selective operating modes in the editing control system, said third control panel further including manually-controllable potentiometer means connected to one of said circuit boards for effectuating forward and reverse motion of the source and record video tape recorders under manual control from a still-frame position and at a speed determined by the setting of the potentiometer means on either side of a neutral position, said potentiometer means including a pivotally mounted joystick control member, switching means connected to one of the circuit boards for selecting the source video tape recorder for control by the potentiometer means when the joystick member is momentarily set to a first position, and for selecting the record video tape recorder by the potentiometer means when the joystick member is momentarily set to a second position, and a manually-operated cruise switch connected to one of said circuit boards to cause said record and source video tape recorders to be driven at speeds selected by said potentiometer means and independent of subsequent settings of said potentiometer means.

3. An editing control system for transferring selecting video information from a video source to a record video tape recorder, said record video tape recorder including a drive motor, said editing control system including: a plurality of solid state electronic circuit boards for controlling the transfer of video information from the source to the record video tape recorder; a microprocessor circuit board connected to said first-named circuit boards for cyclically and successively transmitting signals to and receiving signals from different ones of said circuit boards, manually-controllable potentiometer means connected to one of said circuit boards for effectuating forward and reverse motion of the record video tape recorder at continuously variable speeds; and a manually-operated cruise switch, and in which said last-named circuit board includes a sample and hold circuit connected to said cruise switch to cause the record video tape recorder to be driven at a speed selected by said potentiometer means independent of subsequent settings thereof.

4. An editing control system for transferring selected video information from a video source to a record video tape recorder, said record video tape recorder including a drive motor, said editing control system including: a plurality of solid state electronic circuit boards for controlling the transfer of video information from the source to the record video tape recorder; a microprocessor circuit board connected to said first-named circuit boards for cyclically and successively transmitting signals to and receiving signals from different ones of said circuit boards; manually-controllable potentiometer means connected to one of said circuit boards for effectuating forward and reverse motion of the record video tape recorder at continuously variable speeds; and a manually-operated cruise switch connected to one of said circuit boards to cause the record video tape recorder to be driven at a speed selected by said potentiometer means independent of subsequent settings of said potentiometer means.

5. An editing control system for transferring selected video information from a source video tape recorder to a record video tape recorder, said record video tape recorder including a drive motor, said editing control system including: a plurality of solid state electronic circuit boards for controlling the transfer of video information from the source video tape recorder to the record video tape recorder; a microprocessor circuit board connected to said first-named circuit boards for cyclically and successively transmitting signals to and receiving signals from different ones of said circuit boards; manually-controllable potentiometer means connected to one of said circuit boards for effectuating forward and reverse motion of the source video tape recorder and of the record video tape recorder at continuously variable speeds; said potentiometer means including a pivotally mounted joystick control member, switching means connected to one of the circuit boards for selecting the source video tape recorder for control by the potentiometer means when the joystick member is momentarily set to a first position, and for selecting the record video tape recorder for control by the potentiometer means when the joystick member is momentarily set to a second position, and a manually-operated cruise switch connection to one of said circuit boards to cause said record and source video tape recorders to be driven at speeds selected by said potentiometer means and independent of subsequent settings of said potentiometer means.

* * * * *